US009607083B2

(12) United States Patent
Gomes-Casseres et al.

(10) Patent No.: US 9,607,083 B2
(45) Date of Patent: Mar. 28, 2017

(54) AUDIO SYSTEMS AND RELATED DEVICES AND METHODS

(71) Applicant: Bose Corporation, Framingham, MA (US)

(72) Inventors: Glenn Gomes-Casseres, Framingham, MA (US); Yong Gao, Hopkinton, MA (US); John Michael Sakalowsky, West Newton, MA (US)

(73) Assignee: Bose Corporation, Framingham, MA (US)

( * ) Notice: Subject to any disclaimer, the term of this patent is extended or adjusted under 35 U.S.C. 154(b) by 201 days.

(21) Appl. No.: 14/049,184

(22) Filed: Oct. 8, 2013

(65) Prior Publication Data

US 2014/0277651 A1  Sep. 18, 2014

Related U.S. Application Data

(63) Continuation-in-part of application No. 13/833,394, filed on Mar. 15, 2013.

(51) Int. Cl.
*G06F 17/00* (2006.01)
*G06F 17/30* (2006.01)
(Continued)

(52) U.S. Cl.
CPC .......... *G06F 17/3074* (2013.01); *G06F 3/048* (2013.01); *G06F 3/16* (2013.01); *G06F 17/30772* (2013.01); *H04W 88/02* (2013.01)

(58) Field of Classification Search
CPC ............... G06F 3/048; G06F 17/30578; G06F 17/30575; G06F 17/3074
See application file for complete search history.

(56) References Cited

U.S. PATENT DOCUMENTS

D188,326 S    7/1960  Levy
3,143,182 A   8/1964  Sears
(Continued)

FOREIGN PATENT DOCUMENTS

JP    2012221391 A    11/2012
WO    WO 99/27681 A2 *  6/1999  ............. H04L 12/00
WO    2010008978 A2    1/2010

OTHER PUBLICATIONS

International Search Report and Written Opinion for International application No. PCT/US2014/019346 dated Sep. 15, 2014.
(Continued)

*Primary Examiner* — Fan Tsang
*Assistant Examiner* — David Siegel

(57) ABSTRACT

An audio system including an audio playback device that is configured to operatively connect to a plurality of digital audio sources for playback of content from the digital audio sources and each of the audio playback devices including a set of preset indicators. Each preset indicator in the set of preset indicators is configured to have assigned to it an entity associated with one of the plurality of digital audio sources. A first control device is wirelessly coupled to the audio playback device via a first wireless communication interface and includes a first level of control functionality while a second control device is wirelessly coupled to the audio playback device via a second wireless communication interface and includes a second level of control functionality that is greater than the first level of control functionality.

12 Claims, 36 Drawing Sheets

(51) Int. Cl.
    *G06F 3/16*           (2006.01)
    *H04W 88/02*       (2009.01)
    *G06F 3/048*      (2013.01)

(56) References Cited

U.S. PATENT DOCUMENTS

| | | |
|---|---|---|
| D275,402 S | 9/1984 | O'Brien |
| D275,403 S | 9/1984 | Kubo |
| 5,182,552 A | 1/1993 | Paynting |
| D369,356 S | 4/1996 | Olson |
| 5,864,868 A | 1/1999 | Contois |
| D449,590 S | 10/2001 | Lewis |
| D462,065 S | 8/2002 | Silverstein et al. |
| D471,204 S | 3/2003 | Dowd et al. |
| D482,344 S | 11/2003 | Green |
| 6,874,037 B1 | 3/2005 | Abram et al. |
| D512,988 S | 12/2005 | Green |
| D514,090 S | 1/2006 | Carbone et al. |
| D514,545 S | 2/2006 | Watanabe |
| D532,773 S | 11/2006 | Langberg et al. |
| 7,187,947 B1 | 3/2007 | White et al. |
| D545,827 S | 7/2007 | Evans et al. |
| D554,138 S | 10/2007 | Evans et al. |
| 7,277,765 B1 | 10/2007 | Beckmann et al. |
| D559,853 S | 1/2008 | Evans et al. |
| D563,388 S | 3/2008 | Aquillano |
| D565,582 S | 4/2008 | Gunn et al. |
| D566,125 S | 4/2008 | Evans et al. |
| D566,717 S | 4/2008 | Evans et al. |
| D574,849 S | 8/2008 | Chen |
| D576,148 S | 9/2008 | Lee, Jr. et al. |
| 7,468,934 B1 | 12/2008 | Janik |
| D593,573 S | 6/2009 | Kim et al. |
| D597,551 S | 8/2009 | Stone et al. |
| 7,571,014 B1 | 8/2009 | Lambourne et al. |
| 7,587,366 B2 | 9/2009 | Grim, III et al. |
| D603,368 S | 11/2009 | Jang |
| 7,805,682 B1 | 9/2010 | Lambourne |
| D633,474 S | 3/2011 | Ohashi |
| D637,605 S | 5/2011 | Brinda |
| 8,019,900 B1 | 9/2011 | Sekar et al. |
| D663,288 S | 7/2012 | Aquillano et al. |
| D692,905 S | 11/2013 | Marshall et al. |
| D695,757 S | 12/2013 | Ray et al. |
| 8,688,431 B2 | 4/2014 | Lyons et al. |
| 8,788,080 B1 * | 7/2014 | Kallai ............... H04R 27/00 700/94 |
| D712,425 S | 9/2014 | Nagaoka |
| D717,315 S | 11/2014 | Varon et al. |
| D720,334 S | 12/2014 | Wang |
| D728,598 S | 5/2015 | Lee et al. |
| D729,828 S | 5/2015 | Lee et al. |
| 2003/0151618 A1 | 8/2003 | Johnson et al. |
| 2007/0217436 A1 | 9/2007 | Markley et al. |
| 2008/0089547 A1 | 4/2008 | Young et al. |
| 2008/0091717 A1 | 4/2008 | Garbow et al. |
| 2008/0222546 A1 * | 9/2008 | Mudd ............... G06F 17/30749 715/765 |
| 2009/0176469 A1 | 7/2009 | Nagara et al. |
| 2009/0203403 A1 | 8/2009 | Gidron et al. |
| 2010/0023578 A1 | 1/2010 | Brant et al. |
| 2010/0179672 A1 | 7/2010 | Beckmann et al. |
| 2010/0285763 A1 * | 11/2010 | Ingrassia ............... H04H 20/08 455/185.1 |
| 2010/0299639 A1 | 11/2010 | Ramsay et al. |
| 2011/0131494 A1 | 6/2011 | Ono et al. |
| 2011/0145765 A1 | 6/2011 | Yu et al. |
| 2011/0287757 A1 * | 11/2011 | Nykoluk ............... G08C 17/02 455/419 |
| 2012/0036024 A1 | 2/2012 | Mysen et al. |
| 2012/0096125 A1 | 4/2012 | Kallai et al. |
| 2012/0191816 A1 | 7/2012 | Beckhardt et al. |
| 2012/0266193 A1 | 10/2012 | Ellis et al. |
| 2013/0007208 A1 | 1/2013 | Tsui et al. |
| 2013/0064336 A1 | 3/2013 | Schadt et al. |
| 2014/0277639 A1 | 9/2014 | Gomes-Casseres et al. |
| 2014/0277651 A1 | 9/2014 | Gomes-Casseres et al. |

OTHER PUBLICATIONS

Invitation to Pay Additional Fees for International application No. PCT/US2014/019346 dated May 30, 2014.

"Bose SoundTouch 30/20", Nov. 1, 2013 (Nov. 1, 2013), pp. 1-26, XP055119280, Retrieved from the Internet URL: https://web.archive.org/web/20131101231126/http://worldwide.bose.com/library/assets/pdf/guides/soundtouch20/soundtouch20_eng.pdf [retrieved on May 21, 2014] p. 14-p. 22.

International Search Report and Written Opinion for International application No. PCT/US2014/059322 dated Feb. 17, 2015.

Canadian Office Action dated Sep. 9, 2016 for Canadian Patent Application No. 2,899,801.

First Japanese Office Action dated Dec. 5, 2016 for JP 2016-500499.

* cited by examiner

AUDIO SYSTEMS AND RELATED DEVICES AND METHODS

CROSS-REFERENCE TO RELATED APPLICATIONS

This application is a continuation-in-part of U.S. patent application Ser. No. 13/833,394, filed on Mar. 15, 2013, by Gomes-Casseres, et al., the entire contents of which are incorporated herein by reference.

BACKGROUND

This disclosure relates to audio systems and related devices and methods, and, particularly, to managing (e.g., synchronizing) presets among devices in an audio system.

SUMMARY

All examples and features mentioned below can be combined in any technically possible way.

In one aspect, a method for managing presets in an audio system is provided. The method includes syncing preset assignments on a plurality of audio playback devices such that preset assignments on any one of the audio playback devices correspond to respective preset assignments on each of the other audio playback devices, and, such that, if one of the preset assignments is changed on one of the audio playback devices, each of the other audio playback devices is automatically updated such that a corresponding change is made to a corresponding preset assignment on each of the other audio playback devices. Each of the preset assignments is an assignment of an entity associated with one of a plurality of digital audio sources to one of a plurality of preset indicators on the corresponding one of the audio playback devices.

Implementations may include one of the following features, or any combination thereof.

In some implementations, the step of syncing preset assignments on a plurality of audio playback devices includes receiving information from a first audio playback device of the audio system regarding a change to one or more of a plurality of preset assignments; updating stored preset data based on the information received from the first audio playback device; and providing update information to one or more other audio playback devices of the audio system such that the one or more other audio playback devices update their respective preset assignments to correspond to those of the first audio playback device.

In certain implementations, the step of updating stored preset data includes updating preset data stored on a remote server.

In some implementations, the step of updating stored preset data includes replacing a first set of preset assignments with a second, updated set of preset assignments.

In certain implementations, the method also includes receiving user input regarding the assignment of an entity associated with one of the digital audio sources to one of the preset indicators on a first one of the audio playback devices.

In some implementations, the user input corresponds to actuation of a hardware button on a first one of the audio playback devices.

In certain implementations, the user input is received via a controller connected to the first one of the audio playback devices via a network connection.

In some implementations, the assignable entities include at least (i) user-defined playlists of digital music and (ii) Internet radio stations.

The digital audio sources may include a plurality of Internet radio sites, and the entities may include individual radio stations provided by the Internet radio sites.

In certain implementations, the preset indicators provide access to their respectively assigned entities in the same manner irrespective of the associated digital audio source.

In some implementations, the preset indicators provide for single press access to the respectively assigned entities, irrespective of the digital audio source.

In another aspect, an audio system server includes a processor, and instructions stored on a computer-readable media that. When executed, the instructions cause the processor to: receive information from a first audio playback device of an audio system regarding a change to one or more of a plurality of preset assignments; update stored preset data based on the information received from the first device; and to provide update information to one or more other audio playback devices of the audio system such that each of the one or more other audio playback devices update their respective preset assignments to correspond to those of the first audio playback device. Each of the preset assignments represents an assignment of an entity associated with one of a plurality of digital audio sources to a corresponding preset indicator.

Implementations may include one of the above and/or below features, or any combination thereof.

In some implementations, the audio system server is a cloud-based server.

In certain implementations, the instructions, when executed, cause the processor to provide the update information to the one or more other audio playback devices in response to communication received from the one or more other audio playback devices requesting the update information.

In some implementations, the update information is an updated list of preset assignments.

In certain implementations, the instructions, when executed, cause the processor to: maintain a global recents list. The global recents list is a list of entities that is populated from content that the user has chosen to play on one or more of the audio playback devices.

In some implementations, the instructions, when executed, cause the processor to: receive information from a first audio playback device of an audio system regarding selection of a first entity for providing streamed music; update stored recent data based on the information received from the first device; and to provide updated recents information to one or more other audio playback devices of the audio system such that each of the one or more other audio playback devices updates a locally stored recents list to correspond to a recents list stored on the first audio playback device.

In certain implementations, the instructions, when executed, cause the processor to: receive a copy of a token from a first audio playback device of an audio system, wherein the token is a unique identifier that a corresponding one of the digital audio sources recognizes and associates with a user account, thereby to provide access to the user account; store the copy of the token within the audio system server; and to provide copies of the token other audio playback devices of the audio system such that the corresponding one of the digital audio sources can recognize the other audio playback devices as being associated with the user account.

A further aspect features an audio system that includes i) a plurality of audio playback devices, and ii) a remote server. Each audio playback device is configured to operatively connect to a plurality of digital audio sources for playback of content from the digital audio sources. Each of the audio playback devices includes a set of preset indicators. Each preset indicator in the set of preset indicators is configured to have assigned to it an entity associated with one of the plurality of digital audio sources. The remote server is configured to receive information from one of the audio playback devices regarding changes to preset assignments. Each of the preset assignments represents an assignment of an entity associated with one of the digital audio sources to a corresponding one of the preset indicators. The remote server is further configured to update a stored set of global preset assignments based on the information received; and to distribute update information to the other ones of the audio playback devices regarding changes to the global preset assignments. The other ones of the audio playback devices are configured to update their respective preset assignments based on the update information distributed from the remote server such that, following the update, all of the audio playback devices of the plurality of audio playback devices have the same preset assignments.

Implementations may include one of the above and/or below features, or any combination thereof.

In some implementations, the information received from the one of the audio playback devices is an updated set of global preset assignments.

In certain implementations, the remote server is configured to update the stored set of global preset assignments by replacing the stored set of global preset assignments with the updated set of global preset assignments.

In some implementations, the remote server is configured to distribute the update information to the other ones of the audio playback devices in response to requests for update information received from the other ones of the audio playback devices.

In certain implementations, the set of preset indicators are hardware buttons.

The preset indicators may include numerical identifiers.

Yet another aspect provides an audio playback device that is configured to operably connect to a plurality of digital audio sources. The audio playback device includes a digital-to-analog converter that is configured to receive a digital representation of content from the digital audio sources and convert to analog form; an electro-acoustic transducer; a set of user-selectable preset indicators. Each indicator in the set of preset indicators is configured to have assigned to it an entity associated with the plurality of digital audio sources. The audio playback device also includes a processor and instructions stored on a computer-readable media. The instructions, when executed, cause the processor to: update one or more preset assignments based on user input, and to cause the processor to send information regarding the update to the one or more preset assignments to a remote server. Each of the preset assignments represents an assignment of an entity associated with one of the digital audio sources to a corresponding one of the preset indicators.

Implementations may include one of the above and/or below features, or any combination thereof.

In some implementations, the audio playback device also includes an enclosure. The digital-to-analog converter and the electro-acoustic transducer are located within the enclosure and the set of user-selectable present indicators is located on the enclosure.

In certain implementations, the digital audio sources include at least (i) one or more libraries of user-defined playlists of digital music files and (ii) Internet radio sites.

In some implementations, the instructions, when executed, cause the processor to: notify one or more other audio playback devices within an audio system regarding the update to the one or more preset assignments.

In certain implementations, the instructions, when executed, cause the processor to: receive notification from an other audio playback device within an audio system regarding changes to preset assignments on the other audio playback device; and, in response to receiving the notification regarding changes to the preset assignments on the other audio playback device, to contact a remote server for the audio system to request update information; and to update one or more preset assignments on the audio playback device based on the update information received from the remote server such that preset assignments on the audio playback devices correspond to respective preset assignments on the other audio playback device.

According to another aspect, an audio playback device is configured to operably connect to a plurality of digital audio sources. The audio playback device includes a digital-to-analog converter configured to receive a digital representation of content from the digital audio sources and convert to analog form; an electro-acoustic transducer; and a set of user-selectable preset indicators. Each indicator in the set of preset indicators is configured to have assigned to it an entity associated with the plurality of digital audio sources. The audio playback device also includes a processor and instructions stored on a computer-readable media. The instructions, when executed, cause the processor to: update one or more preset assignments based on user input; and to notify one or more other audio playback devices within an audio system regarding the update to the one or more preset assignments. Each of the preset assignments represents an assignment of an entity associated with one of the digital audio sources to a corresponding one of the preset indicators.

Implementations may include one of the above and/or below features, or any combination thereof.

In some implementations, the digital audio sources include at least (i) one or more libraries of user-defined playlists of digital music files and (ii) Internet radio sites.

In certain implementations, the assignable entities include at least individual Internet radio stations and particular user-defined playlists of digital music files.

In some implementations, the digital audio sources include a plurality of Internet radio sites, and the entities include individual radio stations provided by the Internet radio sites.

In certain implementations, the instructions, when executed, cause the processor to: receive notification from an other audio playback device within an audio system regarding changes to preset assignments on the other audio playback device; and, in response to receiving the notification regarding changes to the preset assignments on the other audio playback device, to contact a remote server for the audio system to request update information; and to update one or more preset assignments on the audio playback device based on the update information received from the remote server such that preset assignments on the audio playback devices correspond to respective preset assignments on the other audio playback device.

In a further aspect, an audio playback device is configured to operably connect to a plurality of digital audio sources. The audio playback device includes a digital-to-analog converter configured to receive a digital representation of content from the digital audio sources and convert to analog form; an electro-acoustic transducer; and a set of user-selectable preset indicators. Each indicator in the set of preset indicators is configured to have assigned to it an entity associated with the plurality of digital audio sources. The audio playback device also includes a processor and instructions stored on a computer-readable media. The instructions, when executed, cause the processor to receive notification from an other audio playback device within an audio system regarding changes to preset assignments on the other audio playback device; and, in response to receiving the notification regarding changes to the preset assignments on the other audio playback device, to contact a remote server for the audio system to request update information; and to update one or more preset assignments on the audio playback device based on the update information received from the remote server such that preset assignments on the audio playback devices correspond to respective preset assignments on the other audio playback device. Each of the preset assignments represents an assignment of an entity associated with one of the digital music sources to a corresponding one of the preset indicators.

In yet another aspect, an audio system includes i) a plurality of audio playback devices, and ii) a software program configured to run on a separate device (e.g., a separate computer, smartphone, tablet, etc.). Each audio playback device is configured to operatively connect to a plurality of digital audio sources for playback of content from the digital audio sources. Each of the audio playback devices includes a set of preset indicators. Each preset indicator in the set of preset indicators is configured to have assigned to it an entity associated with one of the plurality of digital audio sources. The software program provides a user interface configured to present an audio playback device selection region that enables user to select one of the audio playback devices to control with the separate computer. The user interface is further configured to present a set of preset indicators that corresponds to the set of preset indicators of the selected one of the audio playback devices, and to present a source selection region that enables a user to select an entity to assign to one of the preset indicators of the selected one of the audio playback devices.

Implementations may include one of the above and/or below features, or any combination thereof.

In some implementations, the source selection region also enables a user to select an entity to provide audio content to the selected one of the audio playback devices for playback of the audio content.

In certain implementations, the user interface is further configured to present a global recents. The global recents list is a list of entities that is populated from audio content that the user has chosen to play on one or more of the audio playback devices.

In some implementations, the software program includes instructions to procure the global recents list from data stored on the selected one of the audio playback devices.

In certain implementations, the user interface is further configured to enable a user to select whether the preset assignments are to be global or local. The global preset assignments are synchronized across the plurality of audio playback devices such that preset assignments on any one of the audio playback devices correspond to respective preset assignments on each of the other audio playback devices, and, such that, if one of the preset assignments is changed on one of the audio playback devices, each of the other audio playback devices is updated such that a corresponding change is made to a corresponding preset assignment on each of the other audio playback devices. The local preset assignments are device-specific such that each of the audio playback devices can have a unique set of preset assignments and such that the preset assignments on any one of the audio playback devices do not necessarily correspond to the preset assignments on any of the other audio playback devices.

Another aspect features a computer-implemented method that includes storing a set of local preset assignments for each of a plurality of audio playback devices of an audio system. The local preset assignments are device-specific such that the local preset assignments for any one of the audio playback devices do not necessarily correspond to the local preset assignments for any of the other audio playback devices. The method also includes receiving input regarding a change from a local setting to a global setting; receiving input regarding selection of one of the audio playback devices to serve as a master audio playback device; setting the set of stored local preset assignments associated with the selected, master audio playback device as a set of global preset assignments; and providing the global preset assignments to the other playback devices of the audio system so as to synchronize the preset assignments across the audio system, such that preset assignments on any one of the audio playback devices correspond to respective preset assignments on each of the other audio playback devices.

DETAILED DESCRIPTION

This disclosure is based, at least in part, on the realization that it can be beneficial to synchronize presets among various devices within an audio system. It may be further beneficial to curate a list of recently access entities for providing audio content which can be shared among various devices within an audio system. Such features can help to facilitate quick and easy access to a user's preferred audio content.

System Overview

Figure 1:
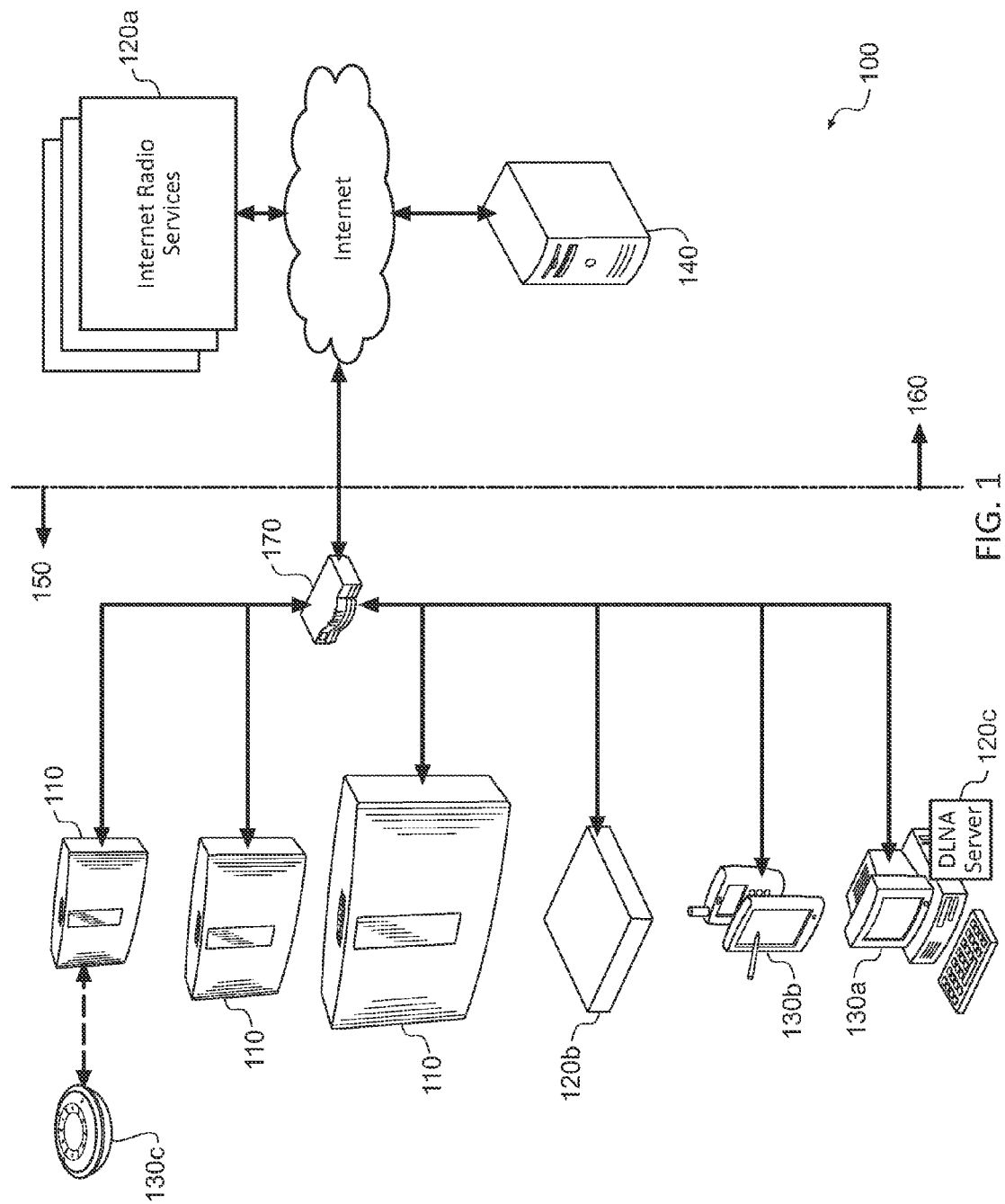
FIG. 1 is a schematic view of an audio system that facilitates synchronization of presets among various system devices.

Referring to FIG. 1, an audio system 100 for the delivery of digital audio (e.g., digital music) provides for easy, quick access to a variety of digital audio sources through the use of preset assignments. At a very high level, there are four main categories of devices in the audio system 100: (i) audio playback devices 110; (ii) digital audio sources 120a, 120b, 120c (collectively referenced as 120); controllers 130a, 130b, 130c (collectively referenced as 130); and a server 140.

The audio playback devices 110 are electronic devices which are capable of rendering audio content. These devices can access stored audio content (e.g., remotely stored audio content) and stream it for playback. In some cases, the audio playback devices 110 may also be capable of playing locally stored content. These devices render audio with the help of audio codecs and digital signal processors (DSPs) available within.

The audio playback devices 110 can communicate with each other. For example, each audio playback device 100 can communicate with the other audio playback devices 110 within the audio system 100 for synchronization. This can be a synchronization of device settings, such as synchronization of preset assignments, or, for synchronization of playback (e.g., such that all or a subset of the audio playback devices 110 play the same content simultaneously and synchronously).

The digital audio sources 120 are devices and/or services that provide access to one or more associated entities for supplying content (e.g., audio streams) to the audio playback devices 110, and which can be located remotely from the audio playback devices 110. An "entity," as used herein, refers to a grouping or collection of content for playback. Exemplary entities include Internet radio stations and user defined playlists. "Content" is data (e.g., an audio track) for playback. "Associated entity" refers to an entity that is associated with a particular audio source. For example, if the digital audio source 120 is an Internet music service such as Pandora®, an example associated entity would be a radio station provided by Pandora®.

For the purposes of the audio system 100, audio streams are considered to be data. They are processed as digital information that is converted to analog before presentation. Data streaming is the method by which data is moved from an audio source 120 to an audio playback device 110. Typically, there are two models for this data movement, push and pull. The audio system 100 is capable of managing this audio (data) streaming in both fashions; descriptions of these processes are as follows.

In a push model, the digital audio source 120 will move the data to the audio playback device 110 at a pace that it desires. The recipient (e.g., one of the audio playback devices 110) of the data will acknowledge the data and the digital audio source 120 will provide more data. This model requires the digital audio source 120 to be managing the throughput characteristics of the audio system 100. In a pull model, the audio playback device 110 will request data from the digital audio source 120 at a rate it desires. This allows the audio playback device 110 to read ahead if data is available.

The digital audio sources 120 each maintain a repository of audio content which can be chosen by the user to play. The digital audio sources 120 can be based on the Digital Living Network Alliance® (DLNA) or other Web based protocols similar to the Hypertext Transfer Protocol (HTTP). Some of the devices and services in this category include Internet based music services 120a such as Pandora®, Spotify®, and vTuner®; network-attached storage (NAS) devices 120b, and a media server daemon 120c (e.g., provided as a component of a computer-based controller).

The digital audio sources 120 include user defined playlists of digital music files available from network audio sources such as network-attached storage (NAS) devices 120b, and a DLNA server 120c which may be accessible to the audio playback devices 110 over a local area network such as a wireless (Wi-Fi) or wired (Ethernet) home network 150, as well as Internet radio sites 120a such as Pandora®, vTuner®, Spotify®, etc., which are accessible to the audio playback devices 110 over a wide area network 160 such as the Internet.

The controllers 130 are responsible for controlling the audio playback devices 110 and for browsing the audio sources 120 in the audio system 100. Some of the devices in this category include desktop computers, laptop computers, and mobile devices such as smart phones and tablets. These devices control the audio playback devices 110 via a wireless communication interface (e.g., IEEE 802.11 b/g/n/ac, Bluetooth LE, infrared, etc.). The controllers 130 serve as an online management tool for a user's network enabled audio playback devices 110. The controllers 130 provide interfaces which enable to the user to perform one or more of the following: setup a connection to a Wi-Fi network; create an audio system account for the user, sign into a user's audio system account and retrieve information; add or remove an audio playback device 110 on a user's audio system account; edit an audio playback device's name, and update software; access the audio sources (via the audio playback devices 110); assign an entity (e.g., a playlist or radio station) associated with one of the audio sources 120 to a preset indicator; browse and select recents, where "recents" refers to recently accessed entities; use transport controls (play/pause, next/skip, previous), view "Now Playing" (i.e., content currently playing on an audio playback device 110) and album art; and adjust volume levels.

In some cases, the controllers 130 may include network controllers 130a, 130b and auxiliary controllers 130c. The network controllers 130a, 130b are controllers that communicate with the audio playback devices 110 over a wireless (Wi-Fi) network connection. The controllers 130a, 130b, 130c may be used individually or in combination to communicate with the audio playback devices 100. The network controllers 130a, 130b and auxiliary controllers 130c can each offer the same, different, or complementary control and functionality of the audio playback devices 110. Each controller 130 may provide different functionality and control of the associated audio playback devices 110 depending on one or more of following: the type of wireless communication interface (IEEE 802.11 b/g, Bluetooth LE, or infrared, for example) the availability of a display on the controller, the type of controller device including desktop computers, laptop computers, and mobile devices such as smart phones and tablets, and the type, number and nature of available control elements (e.g., buttons, selectable preset indicators) on the controller 130.

The network controllers can include primary network controllers 130a and secondary network controllers 130b. The primary network controllers 130a can be utilized for: connecting an audio playback device 110 to a Wi-Fi network (via a USB connection between the audio playback device 110 and the primary network controller 130a); creating a system account for the user; setting up music services; browsing of content for playback; setting preset assignments on the audio playback devices 110; transport control (e.g., play/pause, fast forward/rewind, etc.) for the audio playback devices 110; and selecting audio playback devices 110 for content playback (e.g., single room playback or synchronized multi-room playback). Devices in the primary network controller category can include desktop and laptop computers.

The secondary network controllers 130b may offer some, but not all, of the functions of the primary network controllers 130a. For example, the secondary network controllers 130b may not provide for all of the account setup and account management functions that are offered by the primary network controllers 130a. The secondary network controllers 130b may be used for: music services setup; browsing of content; setting preset assignments on the audio playback devices; transport control of the audio playback devices; and selecting audio playback devices 110 for content playback: single room or synchronized multi-room playback. Devices in the secondary network controller category can include mobile devices such as smart phones and tablets.

The auxiliary controllers 130c communicate wirelessly (e.g., via Bluetooth low energy (BTLE) and/or IR) with an associated (e.g., paired) one of the audio playback devices (item 110, FIG. 1). The auxiliary controllers 130c may offer full or limited functionality. In some examples, the auxiliary controllers 130c may be used for: browsing of content including exploring digital audio sources 120a, 120b, 120c; setting of preset assignments on the associated one of the audio playback devices 110; selecting a preset assignment on the associated one of the audio playback devices 110; and transport control (play/pause, etc.) of the associated audio playback device 110. In one example, the auxiliary controller 130c is a native, battery-powered wireless remote control configured for use with the associated audio playback device 110. The auxiliary controller 130c can include a display or indicators to provide status information relating to the associated playback device 110.

The server 140 is a cloud-based server which contains (e.g., within an account database) information related to a user's audio system account. This includes user account information such as the list of the audio playback devices 110 within the system 100, device diagnostic information, preset assignments, etc. The server 140 will be connected to by the audio playback devices 140 and by the controllers 130 (e.g., by primary network controllers) for the purpose of preset management, as well as management of audio sources 120 and management of the user's audio system account. Generally, the controllers 130 (e.g., network controllers 130a, 130b) will login to the server 140 with a user's login details and 'sync down' the required information to work with.

The audio playback devices 110 and one or more of the controllers 130 are coupled to a local area network (LAN) 150. Other devices such as one or more of the digital audio sources (e.g., a network-attached storage (NAS) device 120b) may also be coupled to the LAN 150. The LAN 150 may be a wired network, a wireless network, or a combination thereof. In one example, the devices (e.g., audio playback devices 110 and controllers 130 (e.g., primary and secondary controllers 130a, 130b)) within the LAN 150 are wirelessly coupled to the LAN 150 based on an industry standard such as IEEE 802.11 b/g. The LAN 150 may represent a network within a home, an office, or a vehicle. In the case of a residential home, the audio playback devices 110 may be arranged in different rooms (e.g., kitchen, dining room, basement, etc.) within the home. The devices within the LAN 150 connect to a user supplied access point 170 (e.g., a router) and subsequently to a wide area network (WAN) 160 (e.g., the Internet) for communication with the other digital audio sources 120 (Internet based music services 120a) and the server 140.

Notably, the audio system 100 can provide for the management of presets (a/k/a preset assignments) and recents. Presets are a set of (e.g., six) user-defined shortcuts to content, intended to provide quick access to entities associated with the digital music sources 120 from (1 of 6) preset indicators present on each of the audio playback devices 110. In some cases, the preset indicators can be hardware buttons. Alternatively, the preset indicators may be virtual buttons defined by regions on a touch sensitive display. The individual preset indicators can be denoted with numerical identifiers.

The preset indicators the audio playback devices 110 provide access to their respectively assigned entities irrespective of the associated digital audio source. More specifically, the preset indicators can provide for single press access to the respectively assigned entities, irrespective of the digital audio source. That is, a single press of a preset indicator will start the streaming and rendering of content from an entity assigned to that preset indicator regardless of the audio source providing that entity. In that regard, the presets are said to be source agnostic in that they behave in the same manner regardless of the audio source. In some cases, the single press access can be facilitated with the distribution of tokens for accessing account based audio sources which normally require a user to login with account credentials.

The presets can be global or local at the user's option. The user can select the global or local option, e.g., during set up of the user's system account. If the user's account is set to provide for global presets, the preset assignments will be synchronized on all the audio playback devices 110 across the audio system 100 such that preset assignments on any one of the audio playback devices correspond to respective preset assignments on each of the other audio playback devices (e.g., such that preset indicator "1" on a first one of the audio playback devices is assigned to the same entity as preset indicator "1" on all of the other audio playback devices 110 in the audio system 100), and, such that, if one of the preset assignments is changed on one of the audio playback devices 110, each of the other audio playback devices 110 is automatically updated such that a corresponding change is made to a corresponding preset assignment on each of the other audio playback devices. The synchronization of the preset assignments is managed through a combination of communications between the audio playback devices 110 with the server 140, and communications among the audio playback devices 110 themselves. A copy of the global preset assignments is stored locally on each audio playback device 110 associated with the user's account, and a copy of the global preset assignments is also maintained on the server 140.

Figure 2:
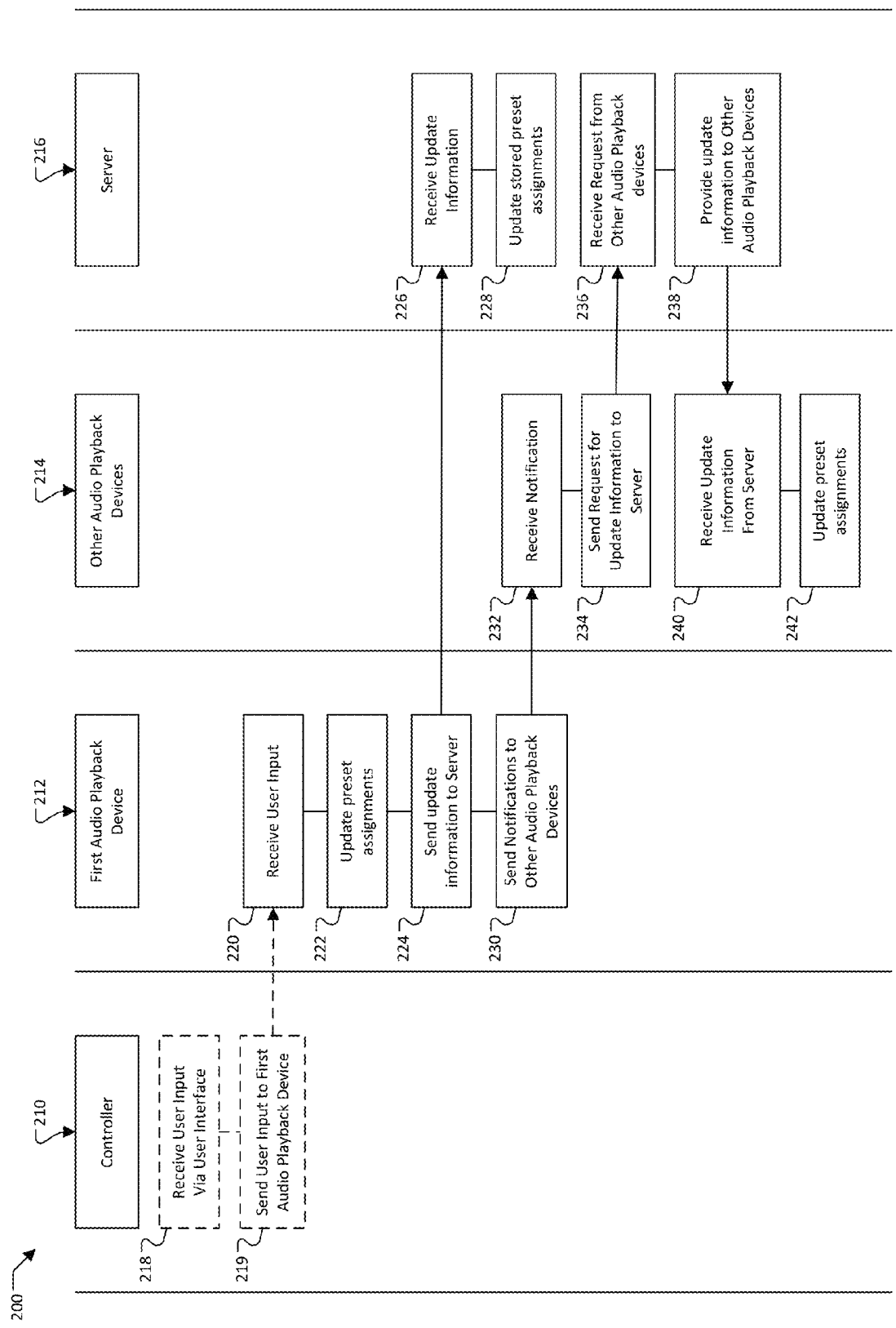
FIG. 2 is a swim lane diagram showing steps of managing/synchronizing "global" presets within the audio system of FIG. 1.

FIG. 2 is a swim lane diagram 200 showing steps of managing/synchronizing "global" presets. "Swim lane" diagrams may be used to show the relationship between the various "actors" in the processes and to define the steps involved in the processes. FIG. 2 (and all other swim lane Figures) may equally represent a high-level block diagram of components of the invention implementing the steps thereof. The steps of FIG. 2 (and all the other FIGS. employing swim lane diagrams) may be implemented on computer program code in combination with the appropriate hardware. This computer program code may be stored on storage media such as a diskette, hard disk, CD-ROM, DVD-ROM or tape, as well as a memory storage device or collection of memory storage devices such as read-only memory (ROM) or random access memory (RAM). Additionally, the computer program code can be transferred to a workstation over the Internet or some other type of network.

Referring to FIG. 2, four swim lanes are shown including a lane for one of the controllers 210, a lane for a first one of the audio playback devices 212, a lane for the other audio playback devices 214, and a lane for the server 216. At step 220, a first audio playback device (i.e., a first one of the audio playback devices 110, FIG. 1) receives user input regarding the assignment of an entity associated with one of the digital audio sources to one of the preset indicators on the audio playback device. In some cases, the user provides input directly to the audio playback devices, such as by pressing one of the preset indicators on the audio playback device. Alternatively, the user may provide input via a user interface on a selected one of the controllers (218), and the controller communicates the user input to the first audio playback device (219).

At step 222, the first audio playback device updates one or more preset assignments based on the user input. Updating can include updating data corresponding to the preset assignments stored locally (e.g., within memory) on the audio playback device.

At step 224, the first audio playback device sends information regarding the update to the one or more preset assignments to the remote server for updating a set preset assignments stored on the server. The update information may include an updated set of preset assignments. The audio playback devices may communicate with the server via a hypertext transfer protocol. The first audio playback device may, for example, upload the update information to the server via an HTTP POST command.

The server receives the update information from the first audio playback device (226), and updates a set of preset assignments stored on the server (228). Updating the set of preset assignments can include replacing previously stored data (e.g., a previously stored set of presets) with the updated information (e.g., an updated set of preset assignments).

At step 230, the first audio playback device sends a communication to each of the other audio playback devices (e.g., a separate notification to each of the other audio playback devices) in the audio system notifying the other playback devices that there has been a change to one or more preset assignments.

At step 232, the other audio playback devices receive the notification from the first audio playback device. In response to receiving the notification of change to the preset assignments, the other audio playback devices synchronize their preset assignments with the server. To achieve this synchronization, each of the audio playback devices sends a communication (e.g., an HTTP GET request) to the server requesting update information corresponding to the changes to the preset assignments (234).

At step 236, the server receives the requests from the other audio playback devices. In response to the requests received from the other audio playback devices, the server responds by providing update information (which may consist of an updated set of preset assignments) to the each of the other audio playback devices (238).

At step 240, the other playback devices receive the update information from the server. Upon receipt of the update information, the other playback devices update their respective preset assignments (i.e., by updating preset data) (242). Updating can include removing (deleting) old data and replacing with new, updated data. For example, updating can include replacing a previously stored set of preset assignments and replacing with an updated set of preset assignments. Following these steps all of the audio playback devices will have the same preset assignments, and the server will have a copy of the preset assignments.

Alternatively, if the user elects to set the user's system account to provide for local presets, the preset assignments will be device-specific such that the preset assignments on any one of the audio playback devices 110 will not necessarily correspond to the preset assignments on any of the other audio playback devices 110. A copy of the respective local preset assignments is stored locally on each audio playback device 110 associated with the user's account, and a copy of the local preset assignments for each audio playback device 110 is also maintained on the server 140.

Figure 3:
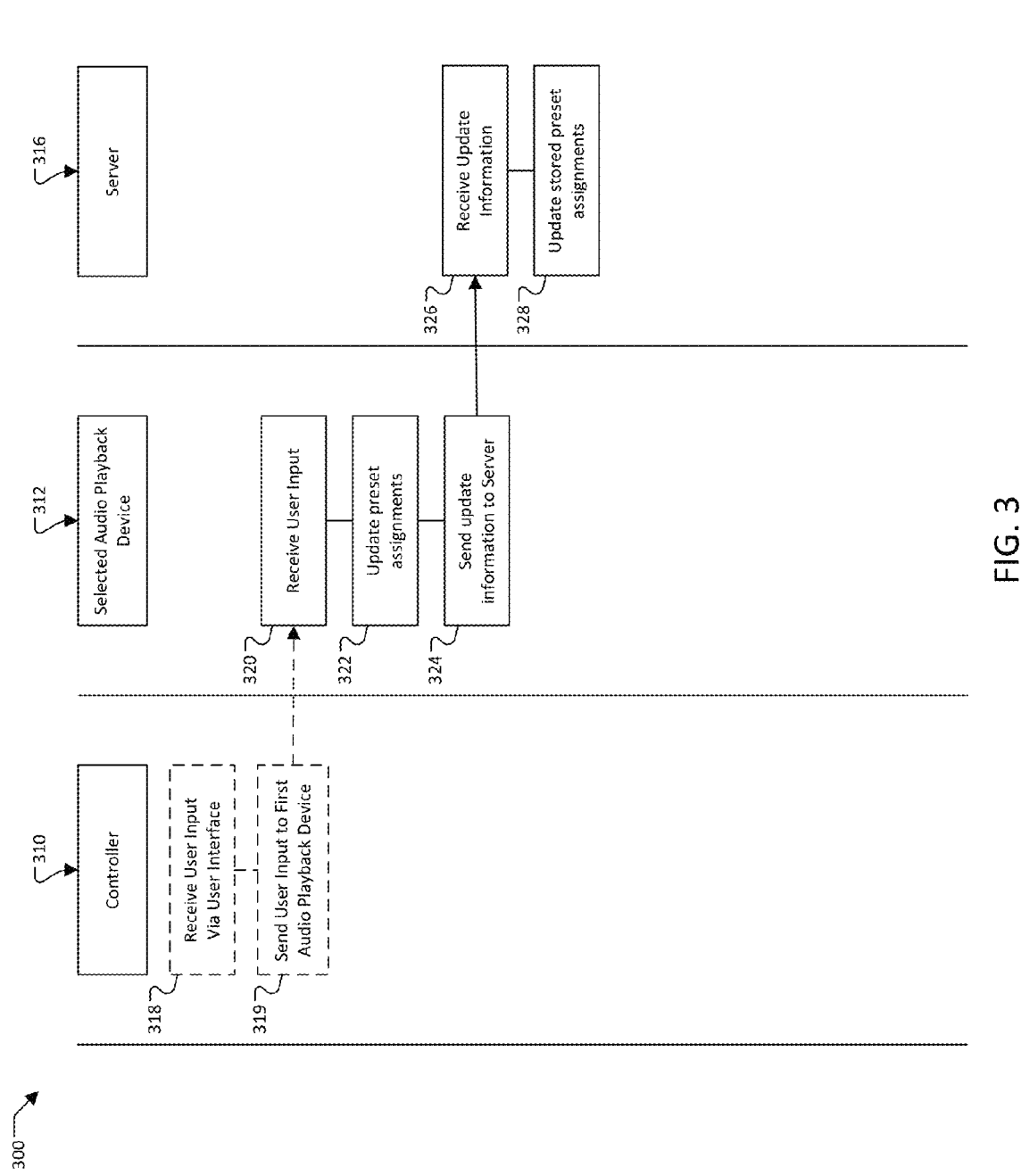
FIG. 3 is a swim lane diagram showing steps of managing "local" presets within the audio system of FIG. 1.

FIG. 3 is a swim lane diagram 300 illustrating steps for managing local presets. Three swim lanes are shown including a lane for one of the controllers 310, a lane for a first one of the audio playback devices 312, and a lane for the server 316. At step 320, a selected audio playback device (i.e., a selected one of the audio playback devices 110, FIG. 1) receives user input regarding the assignment of an entity associated with one of the digital audio sources to one of the preset indicators on the audio playback device. In some cases, the user provides input directly to the audio playback devices, such as by pressing one of the preset indicators. Alternatively, the user may provide input via a user interface on one of the controllers (318), and the controller communicates the user input to the selected audio playback device (319).

At step 322, the selected audio playback device updates one or more preset assignments based on the user input. Updating can include updating data corresponding to the preset assignments stored locally (e.g., within memory) on the selected audio playback device.

At step 324, the selected audio playback device sends information regarding the update to the one or more preset assignments to the remote server for updating a set of preset assignments stored on the server. The update information may include an updated set of preset assignments. The audio playback devices may communicate with the server via a hypertext transfer protocol. The first audio playback device may, for example, upload the update information to the server via an HTTP POST command.

The server receives the update information from the selected audio playback device (326), and updates a set of preset assignments stored on the server (328). Updating the set of preset assignments can include replacing previously stored data (e.g., a previously stored set of presets) with the updated information (e.g., an updated set of preset assignments). When the presets are set to local, the server will maintain (store and update) a separate set of presets for each audio playback device in the audio system.

The maintenance of a copy of the respective preset assignments for each of the audio playback devices on the server can be beneficial, for example, where the user elects to change from a local setting to a global setting after the individual devices have already been programmed with respective preset assignments. In such a situation, the server will prompt the user (e.g., via one of the controllers) to select one of the audio playback devices to serve as a master device. The server can then set the preset assignments for the selected master audio playback device as a set of global preset assignments and can provide the global preset assignments to the other audio playback devices in the audio system so as to synchronize the presets across the audio system.

The "recents list" (a/k/a "recents") is a list of entities that is populated from content that the user has chosen to play. Recent entities can include Internet radio stations (e.g., for Pandora® and vTuner®), and a "group of tracks" selected for Spotify® and stored music. The "group of tracks" is a "parent" of a currently playing track, based on whatever the user either browsed to or searched for (e.g., Album, Playlist, Genre>All, Artist>All, etc.). The controllers 130, and, in some cases, the audio playback devices 110, can provide access to the recents by displaying the recents list to the user and allowing the user to browse the recents list and select entities therefrom.

The recents can be limited to a predetermined number of entities (e.g., 50-100 entities). Alternatively or additionally, the recents may be limited by date. For example, the recents may be limited to entities accessed by the user within the last day, month, year, etc., with older entries being purged from the list.

Figure 4:
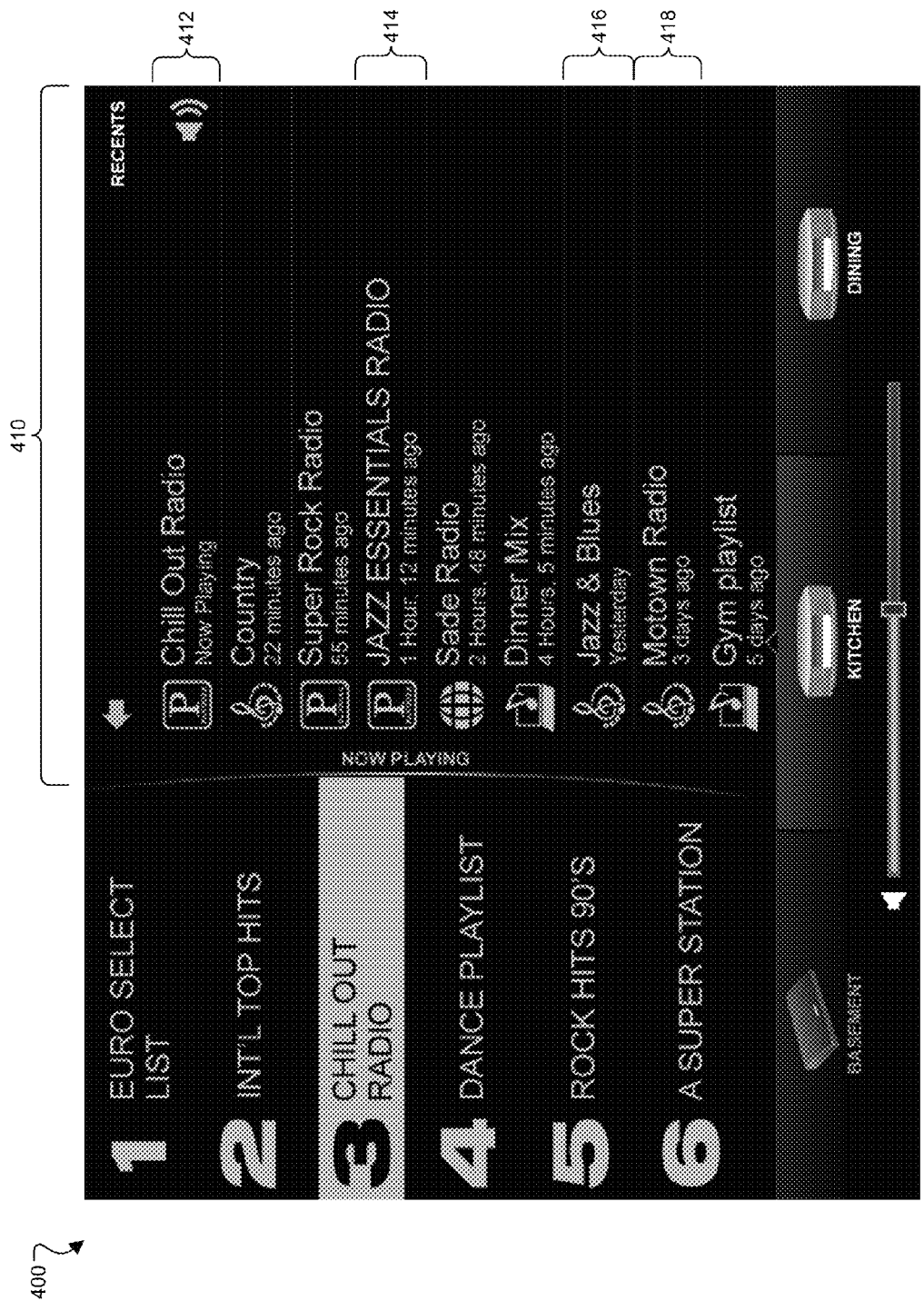
FIG. 4 is a screen shot of a user interface provided by a controller which displays a recents list within the audio system of FIG. 1.

FIG. 4 is an exemplary user interface 400 which may be provided by one of the controllers 130 (FIG. 1), and which displays the recents list 410. The recents entries can be presented in reverse chronological order. "Now playing" (currently playing) tracks, if any, can be presented at the top of the list when the recents are displayed to the user (412), and may include an indication of where (i.e., on which of the audio playback devices) they are playing.

Other entities included in the recents list can be displayed along with an indication of the time since they were last started. Within the same day this can take the format of "X hours"+"Y minutes"+"ago" (414). For one day ago (e.g., between 24 and 48 hours ago), "Yesterday" is displayed (416). For more than one day ago (e.g., 48 hours or more) the time can be display in the format of "X days"+"ago" (418).

As described below, the controllers 130 can be utilized to control the music selection on the audio playback devices 110 on a device-by-device (i.e., audio playback device by audio playback device) basis. Selecting a "Now Playing" entity from the recents list joins the corresponding music stream if it is not already joined.

As with the presets, the recents can be global (applied to all audio playback devices associated with a user's account) or local (device-specific) at the user's option. The same local/global toggle can be leveraged for both the presets and the recents. That is, one "global/local" setting can dictate whether the presets and recents are global or local. In some cases, the default setting is "global."

Figure 5:
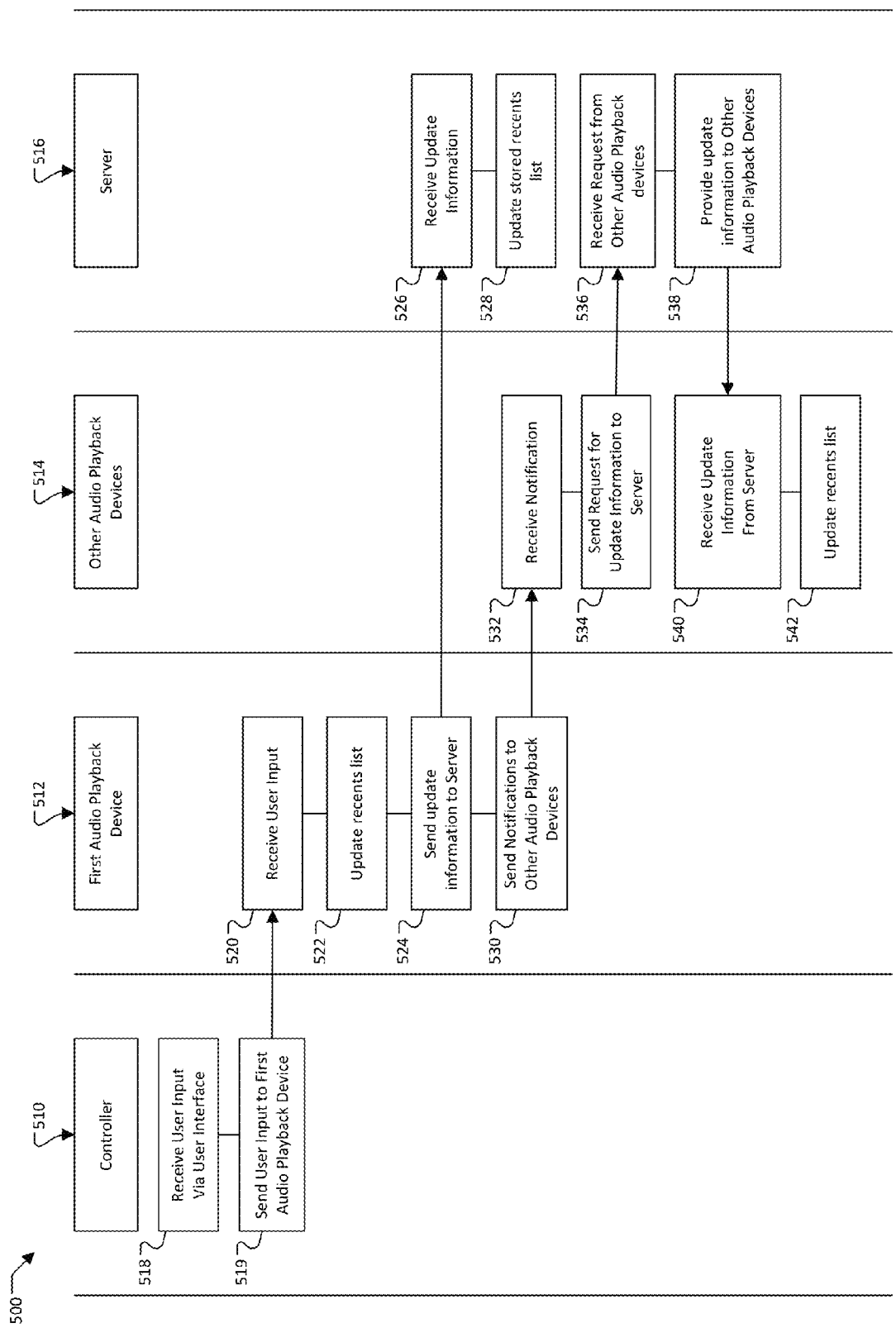
FIG. 5 is a swim lane diagram showing steps of managing/synchronizing "global" recents within the audio system of FIG. 1.

FIG. 5 is a swim lane diagram 500 showing steps for managing global recents. Four swim lanes are shown in FIG. 5 including a lane for a selected one of the controllers 510, a lane for a first one of the audio playback devices 512, a lane for the other audio playback devices 514, and a lane for the server 516. At step 520, a first audio playback device (i.e., a first one of the audio playback devices 110, FIG. 1) receives user input regarding the selection of an entity associated with one of the audio sources for providing streamed audio. In this regard, the user may provide input via one of the controllers (518), and the controller can communicate the user input to the first audio playback device (519).

At step 522, the first audio playback device updates a recents list stored locally (e.g., within memory) on that audio playback device to include the recently selected entity.

At step 524, the first audio playback device sends information regarding the update to the recents list to the remote server for updating a recents list stored on the server. The update information may include an updated recents list. The audio playback devices may communicate with the server via a hypertext transfer protocol. The first audio playback device may, for example, upload the update information to the server via an HTTP POST command.

The server receives the update information from the first audio playback device (526), and updates a recents list stored on the server (528). Updating the recents list can include replacing previously stored data (e.g., a previously stored recents list) with the updated information (e.g., an updated recents list).

At step 530, the first audio playback device sends a communication to each of the other audio playback devices (e.g., a separate notification to each of the other audio playback devices) in the audio system notifying the other playback devices that there has been a change to the recents list.

At step 532, the other audio playback devices receive the notification from the first audio playback device. In response to receiving the notification of change to the recents list, the other audio playback devices synchronize their locally stored copies of the recents list with the server. To achieve this synchronization, each of the audio playback devices sends a communication (e.g., an HTTP GET request) to the server requesting update information corresponding to the changes to the recents list (534).

At step 536, the server receives the requests from the other audio playback devices. In response to the requests received from the other audio playback devices, the server responds by providing update information (which may consist of an updated recents list) to each of the other audio playback devices (538).

At step 540, the other playback devices receive the update information from the server. Upon receipt of the update information, the other playback devices update their respective copies of the recents list (i.e., by updating recent data) (542). Updating can include removing (deleting) old data and replacing with new, updated data. For example, updating can include replacing a previously stored recents list and replacing with an updated recents list. Following these steps all of the audio playback devices will have the same recents list, and the server will have a copy of the recents list.

When a user browses recents using one of the controllers, the controller will retrieve the recents list stored locally on a selected one of the audio playback devices for display to the user. Thus, when recents are set to global, the user will be presented with the same list of entities regardless of which one of the audio playback devices the user selects to control though the controller.

Figure 6:
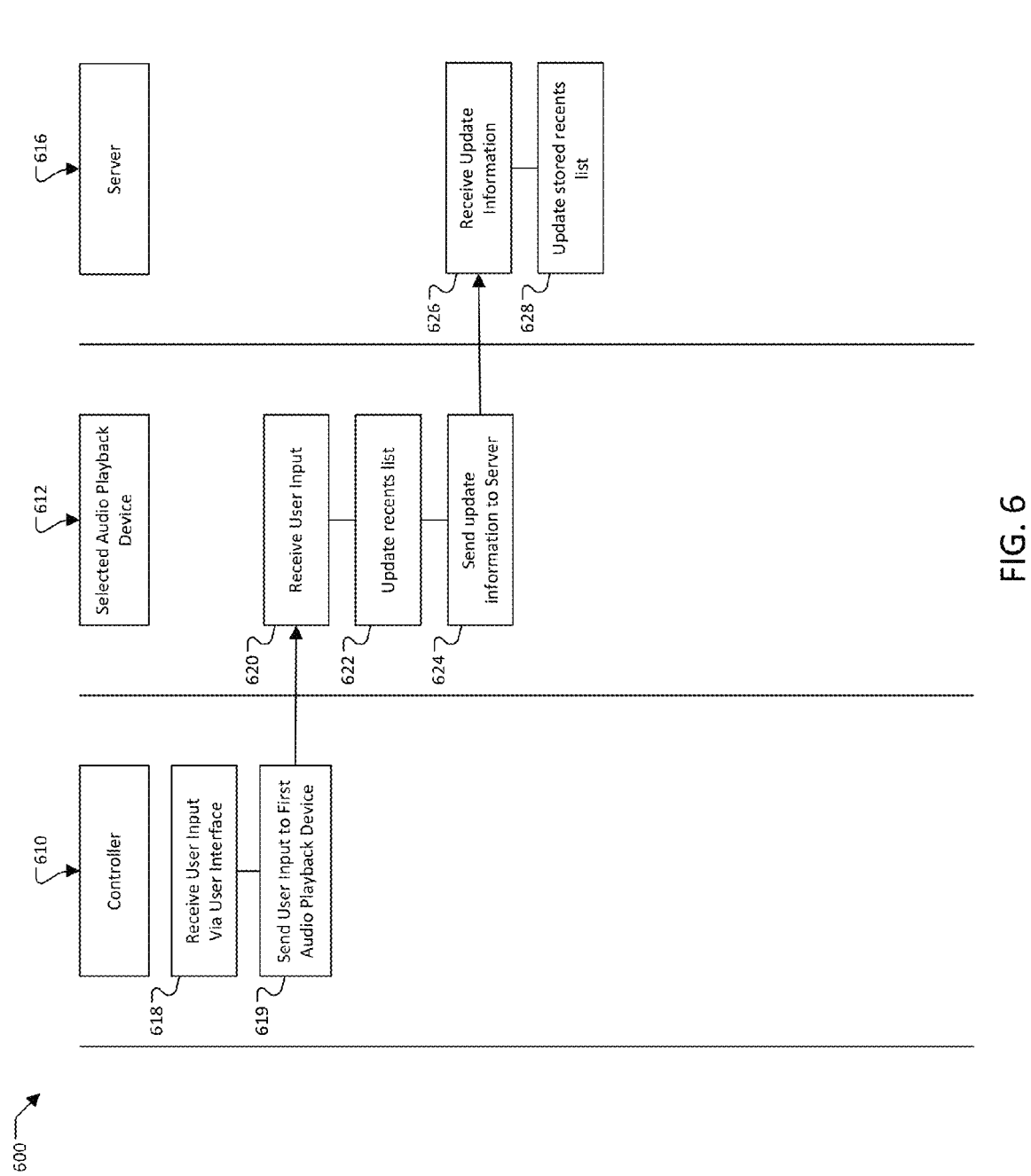
FIG. 6 is a swim lane diagram showing steps for management of "local" recents within the audio system of FIG. 1.

FIG. 6 is a swim lane diagram 600 showing steps for managing local recents. Three swim lanes are shown including a lane for one of the controllers 610, a lane for a selected one of the audio playback devices 612, and a lane for the server 616. At step 620, a selected audio playback device (i.e., a selected one of the audio playback devices 110, FIG. 1) receives user input regarding the selection of an entity associated with one of the audio sources for providing streamed audio. In this regard, the user may provide input via one of the controllers (618), and the controller can communicate the user input to the first audio playback device (619).

At step 622, the selected audio playback device updates a recents list stored locally (e.g., within memory) on that audio playback device to include the recently selected entity.

At step 624, the selected audio playback device sends information regarding the update to the recents list to the remote server for updating a recents list stored on the server. The update information may include an updated recents list. The audio playback devices may communicate with the server via a hypertext transfer protocol. The first audio playback device may, for example, upload the update information to the server via an HTTP POST command.

The server receives the update information from the selected audio playback device 626, and updates a recents list stored on the server 628. Updating the recents list can include replacing previously stored data (e.g., a previously stored recents list) with the updated information (e.g., an updated recents list). Thus, when recents are set to local, the user will be presented with the a device specific list of entities that corresponds to the entities that had been most recently accessed by the audio playback device that the user selects to control though the controller. The server will maintain a separate recents list for each audio playback device in the audio system.

The maintenance of a copy of the respective recents lists for each of the audio playback devices on the server can be beneficial, for example, where the user elects to change from a local setting to a global setting after the individual devices have already curated their respective recents lists. In such a situation, the server can prompt the user (e.g., via one of the controllers) to select one of the audio playback devices to serve as a master device. The server can then set the recents list for the selected master audio playback device as a global recents list and can provide the global recents list to the other audio playback devices in the audio system so as to synchronize the recents list across the audio system.

Audio Playback Devices

Figure 7A:
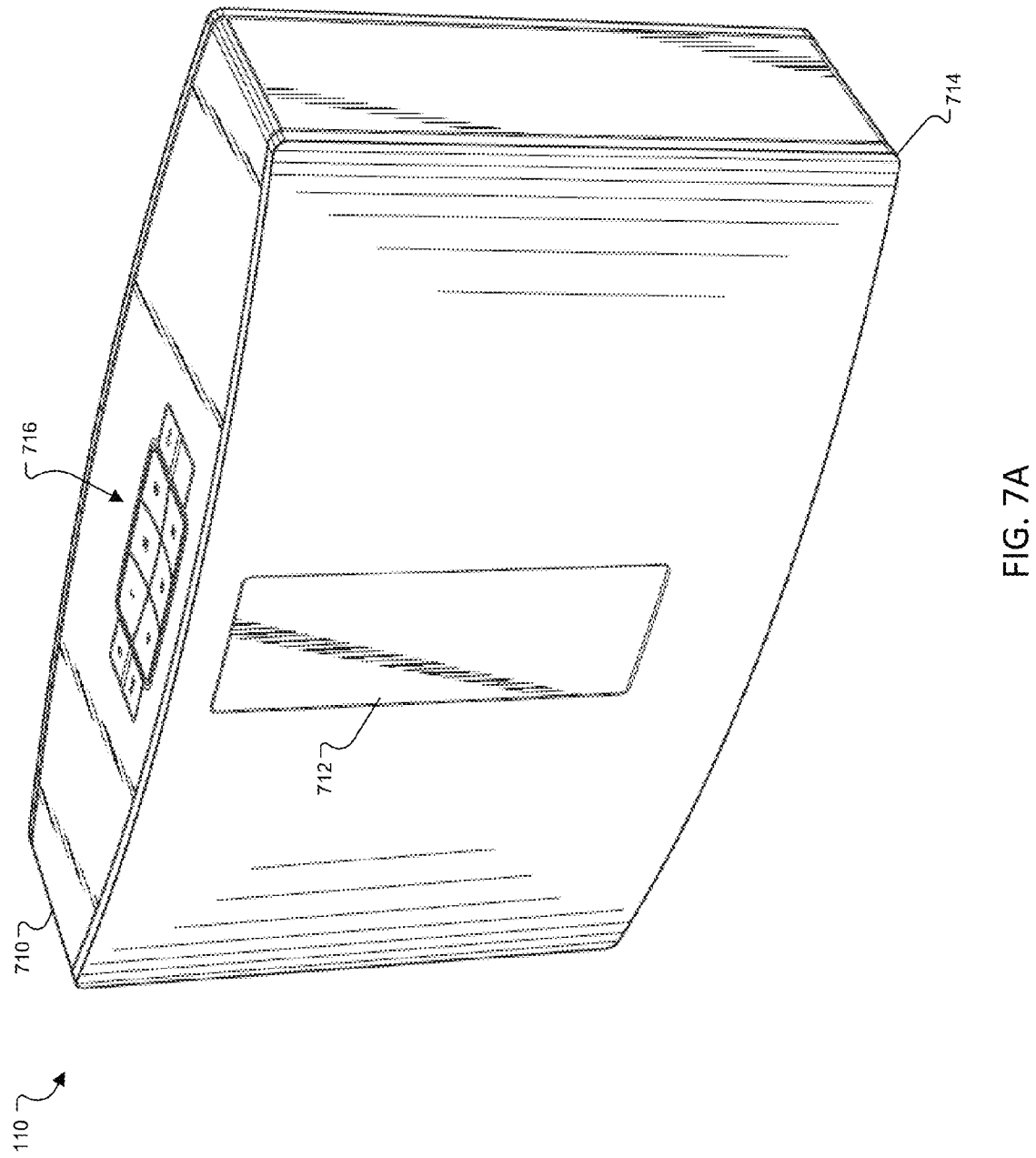
FIGS. 7A and 7B are perspective and top plan views, respectively, of an exemplary audio playback device from the audio system of FIG. 1.
Figure 7B:
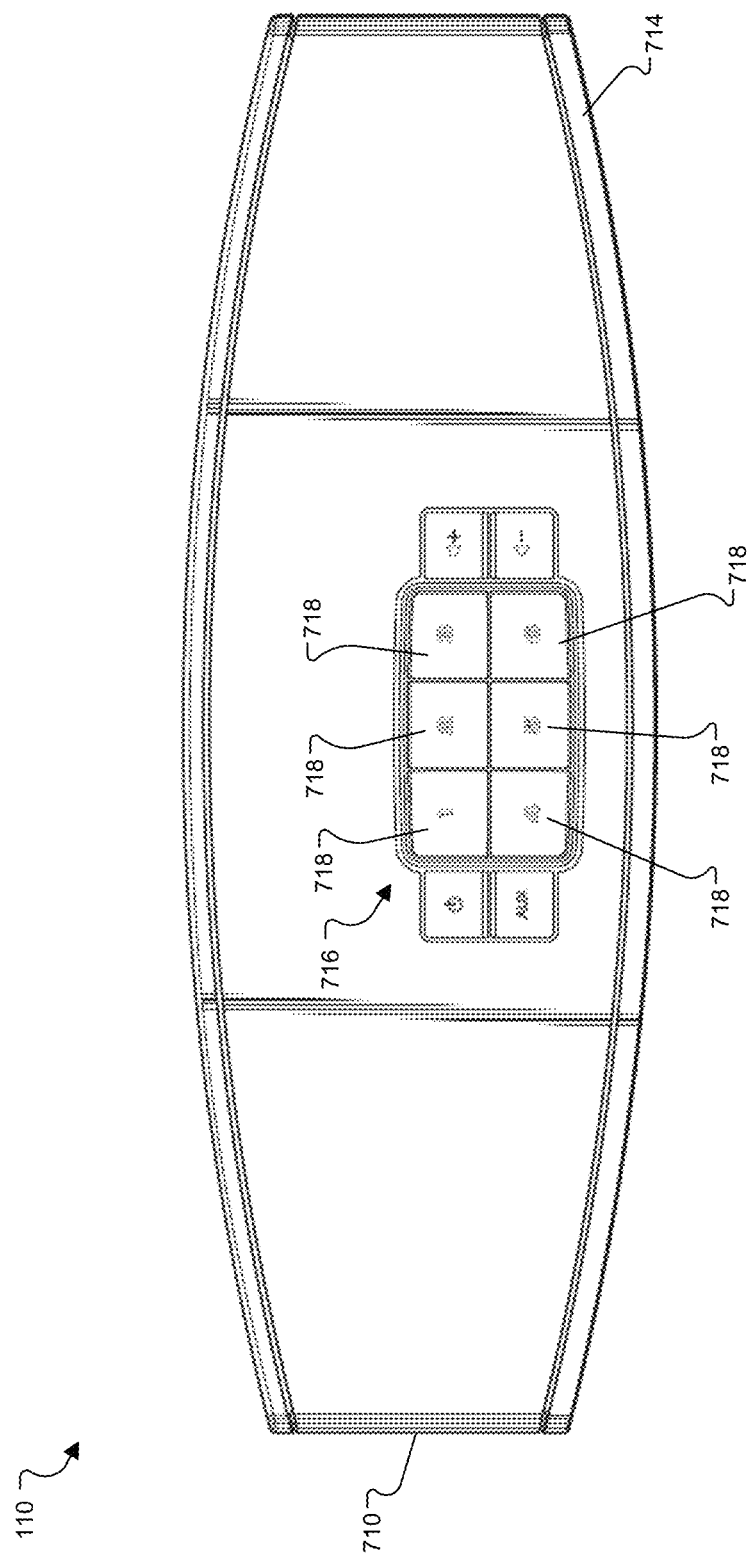
Figure 7C:
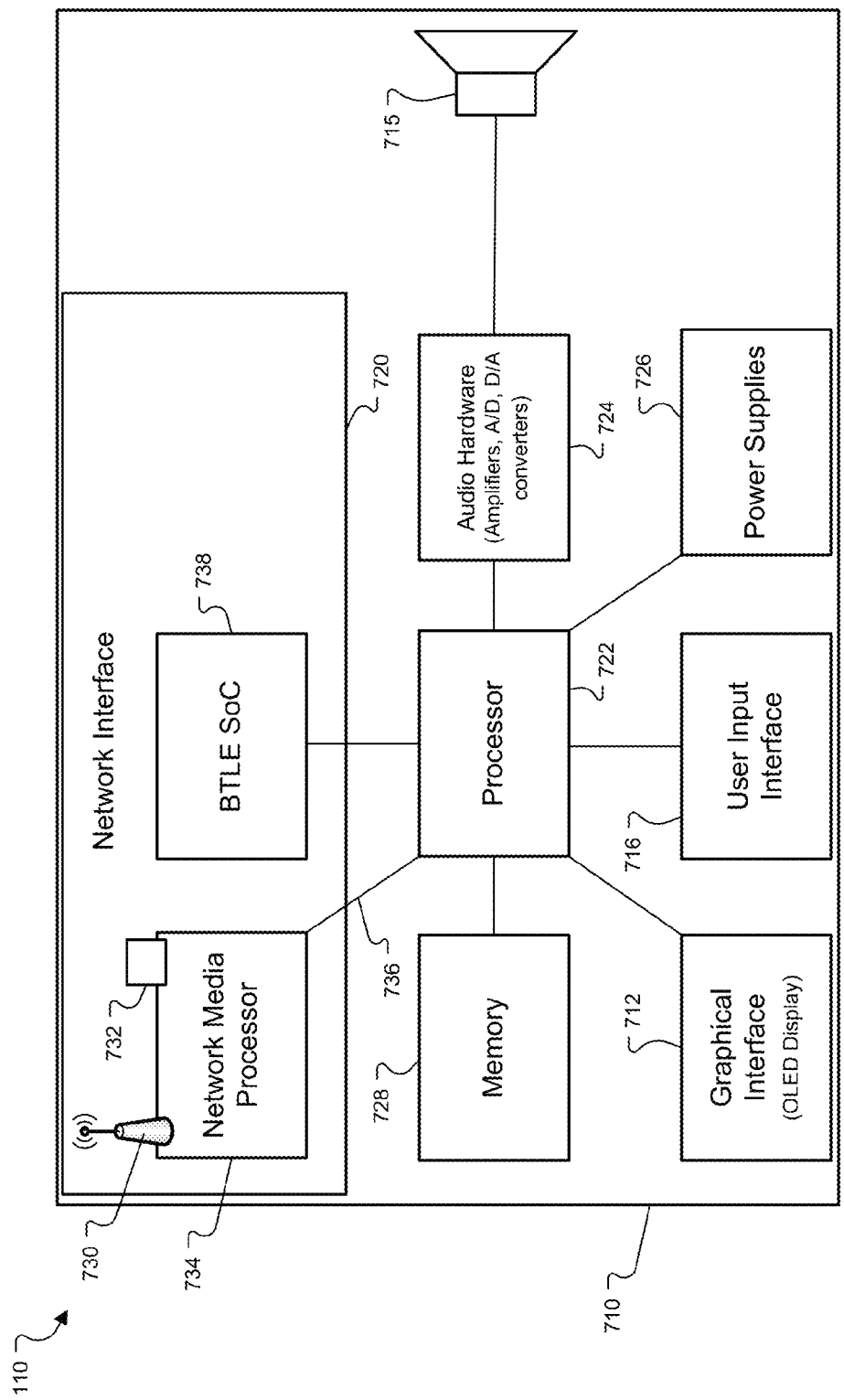
FIG. 7C is a block diagram of the audio playback device of FIG. 7A.

An exemplary audio playback device 110 will now be described in greater detail with reference to FIGS. 7A through 7C. Referring to FIG. 7A, an audio playback device 110 includes an enclosure 710 and on the enclosure 710 there resides a graphical interface 712 (e.g., an OLED display) which can provide the user with information regarding currently playing ("Now Playing") music and information regarding the presets. A screen 714 conceals one or more electro-acoustic transducers 715 (FIG. 7C). The audio playback device 110 also includes a user input interface 716. As shown in FIG. 7B, the user input interface 716 includes a plurality of preset indicators 718, which are hardware buttons in the illustrated example. The preset indicators 718 (numbered 1-6) provide the user with easy, one press access to entities assigned to those buttons. That is, a single press of a selected one of the preset indicators 718 will initiate streaming and rendering of content from the assigned entity.

The assigned entities can be associated with different ones of the digital audio sources (items 120a, 120b, 120c, FIG. 1) such that a single audio playback device 110 can provide for single press access to various different digital audio sources. In one example, the assigned entities include at least (i) user-defined playlists of digital music and (ii) Internet radio stations. In another example, the digital audio sources include a plurality of Internet radio sites, and the assigned entities include individual radio stations provided by those Internet radio sites.

Notably, the preset indicators 718 operate in the same manner, at least from the user's perspective, regardless of which entities are assigned and which of the digital audio sources provide the assigned entities. That is, each preset indicator 718 can provide for single press access to its assigned entity whether that entity is a user-defined playlist of digital music provided by an NAS device or an Internet radio station provided by an Internet music service.

With reference to FIG. 7C, the audio playback device 110 also includes a network interface 720, a processor 722, audio hardware 724, power supplies 726 for powering the various audio playback device components, and memory 728. Each of the processor 722, the graphical interface 712, the network interface 720, the processor 722, the audio hardware 724, the power supplies 726, and the memory 728 are interconnected using various buses, and several of the components may be mounted on a common motherboard or in other manners as appropriate.

The network interface 720 provides for communication between the audio playback device 110 and the controller (e.g., items 130a-c, FIG. 1), the server (item 140, FIG. 1), the audio sources (items 120, FIG. 1) and other audio playback devices 110 via one or more communications protocols. The network interface 720 may provide either or both of a wireless interface 730 and a wired interface 732. The wireless interface 730 allows the audio playback device 110 to communicate wirelessly with other devices in accordance with a communication protocol such as such as IEEE 802.11 b/g. The wired interface 732 provides network interface functions via a wired (e.g., Ethernet) connection.

In some cases, the network interface 720 may also include a network media processor 734 for supporting Apple AirPlay® (a proprietary protocol stack/suite developed by Apple Inc., with headquarters in Cupertino, Calif., that allows wireless streaming of audio, video, and photos, together with related metadata between devices). For example, if a user connects an AirPlay® enabled device, such as an iPhone or iPad device, to the LAN 150, the user can then stream music to the network connected audio playback devices 110 via Apple AirPlay®. A suitable network media processor is the DM870 processor available from SMSC of Hauppauge, N.Y. The network media processor 734 provides network access (i.e., the Wi-Fi network and/or Ethernet connection can be provided through the network media processor 734) and AirPlay® audio. AirPlay® audio signals are passed to the processor 722, using the I²S protocol (an electrical serial bus interface standard used for connecting digital audio devices), for downstream processing and playback. Notably, the audio playback device 110 can support audio-streaming via AirPlay® and/or DLNA's UPnP protocols, and all integrated within one device.

All other digital audio coming from network packets comes straight from the network media processor 734 through a USB bridge 736 to the processor 722 and runs into the decoders, DSP, and eventually is played back (rendered) via the electro-acoustic transducer(s) 715.

The network interface 710 can also include a Bluetooth low energy (BTLE) system-on-chip (SoC) 738 for Bluetooth low energy applications (e.g., for wireless communication with a Bluetooth enabled controller (item 130c, FIG. 1)). A suitable BTLE SoC is the CC2540 available from Texas Instruments, with headquarters in Dallas, Tex.

Streamed data pass from the network interface 720 to the processor 722. The processor 722 can execute instructions within the audio playback device (e.g., for performing, among other things, digital signal processing, decoding, and equalization functions), including instructions stored in the memory 728. The processor 722 may be implemented as a chipset of chips that include separate and multiple analog and digital processors. The processor 722 may provide, for example, for coordination of other components of the audio playback device 110, such as control of user interfaces, applications run by the audio playback device 110. A suitable processor is the DA921 available from Texas Instruments.

The processor 722 provides a processed digital audio signal to the audio hardware 724 which includes one or more digital-to-analog (D/A) converters for converting the digital audio signal to an analog audio signal. The audio hardware 724 also includes one or more amplifiers which provide amplified analog audio signals to the electroacoustic transducer(s) 715 for playback. In addition, the audio hardware 724 may include circuitry for processing analog input signals to provide digital audio signals for sharing with other devices in the acoustic system 100.

The memory 728 stores information within the audio playback device 110. In this regard, the memory 728 may store account information, such as the preset and recent information discussed above. The memory 728 may also provide storage for "tokens" for facilitating single press access to the digital audio sources 120 (e.g., the Internet radio services of FIG. 1). A token, as used herein, is a unique identifier that may be provided by the digital audio source 120 and which allows the digital audio source 120 to recognize the audio playback device 110 as being associated with a user's account with the digital audio source 120 and without requiring the user to enter credentials (e.g., user name, password, etc.) each time the audio playback device 110 attempts to access the digital audio source 120.

The memory 728 may include, for example, flash memory and/or non-volatile random access memory (NVRAM). In some implementations, instructions (e.g., software) are stored in an information carrier. The instructions, when executed by one or more processing devices (e.g., the processor 722), perform one or more processes, such as those described above (e.g., with respect to FIGS. 2, 3, 5, and 6). The instructions can also be stored by one or more storage devices, such as one or more computer- or machine-readable mediums (for example, the memory 728, or memory on the processor). The instructions may include instructions for performing decoding (i.e., the software modules include the audio codecs for decoding the digital audio streams), as well as digital signal processing and equalization.

The instructions may also include instructions for enabling certain "browsing" functionality. That is, at least in some cases, the controllers (items 130a-c, FIG. 1) serve as graphical remote controls for the audio playback devices 110 and do not communicate with the digital audio sources 120 (FIG. 1) directly, but, instead, communicate with the digital audio sources 120 via the audio playback devices 110.

Figure 8:
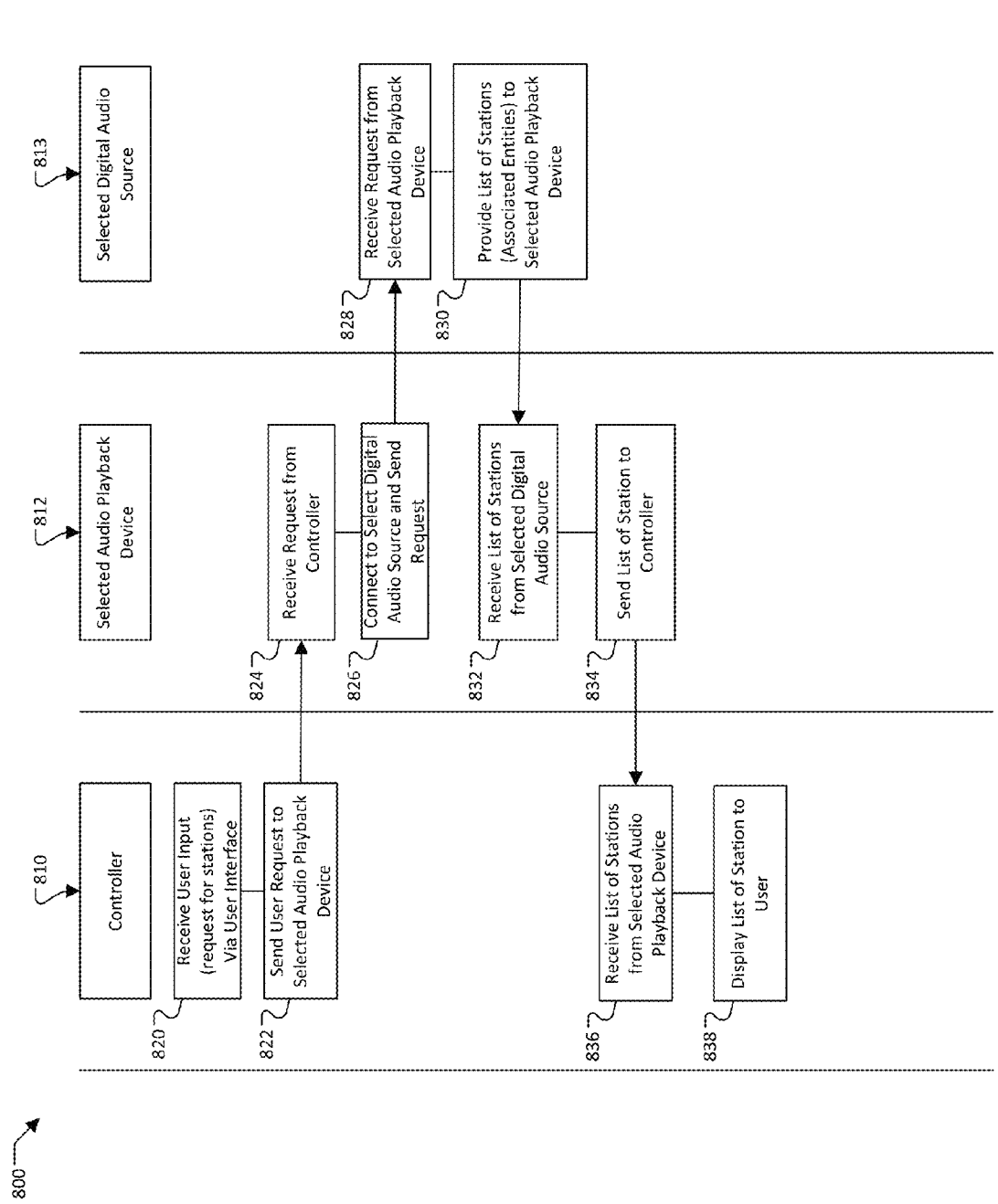
FIG. 8 is a swim lane diagram showing steps for browsing entities associated with one of the digital audio sources within the audio system of FIG. 1.

FIG. 8 is a swim lane diagram 800 showing steps for browsing entities (e.g., stations) associated with one of the digital audio sources (items 120a-c, FIG. 1). Three swim lanes are shown in FIG. 8 including a lane for a selected one of the controllers 810, a lane for a selected one of the audio playback devices 812, and a lane for a selected one of the digital audio sources 813.

At step 820, the controller receives input from a user requesting a list of stations (entities) from a selected one of the digital audio sources (i.e., a digital audio source, within the audio system, that is selected by the user via a user interface provided by the controller). At step 822, the controller sends the request to a selected one of the audio playback devices (i.e., an audio playback device, within the audio system, that is selected by the user via a user interface provided by the controller).

At step 824, the selected one of the audio playback devices receives the request from the controller. In response, the audio playback device connects to the selected digital audio source via the router and Internet connection and requests a list of entities (e.g., stations) associated with that source (826).

At step 828, the selected one of the digital audio sources receives the request from the audio playback device. In response to the request from the audio playback device, the audio source sends a list of available entities to the audio playback device (830). The audio playback device receives the list of available entities (832) and the audio playback device sends the list of available entities along to the controller (834).

The controller receives the list of available entities from the audio playback device (836) and displays the list to the user (838).

Figure 9:
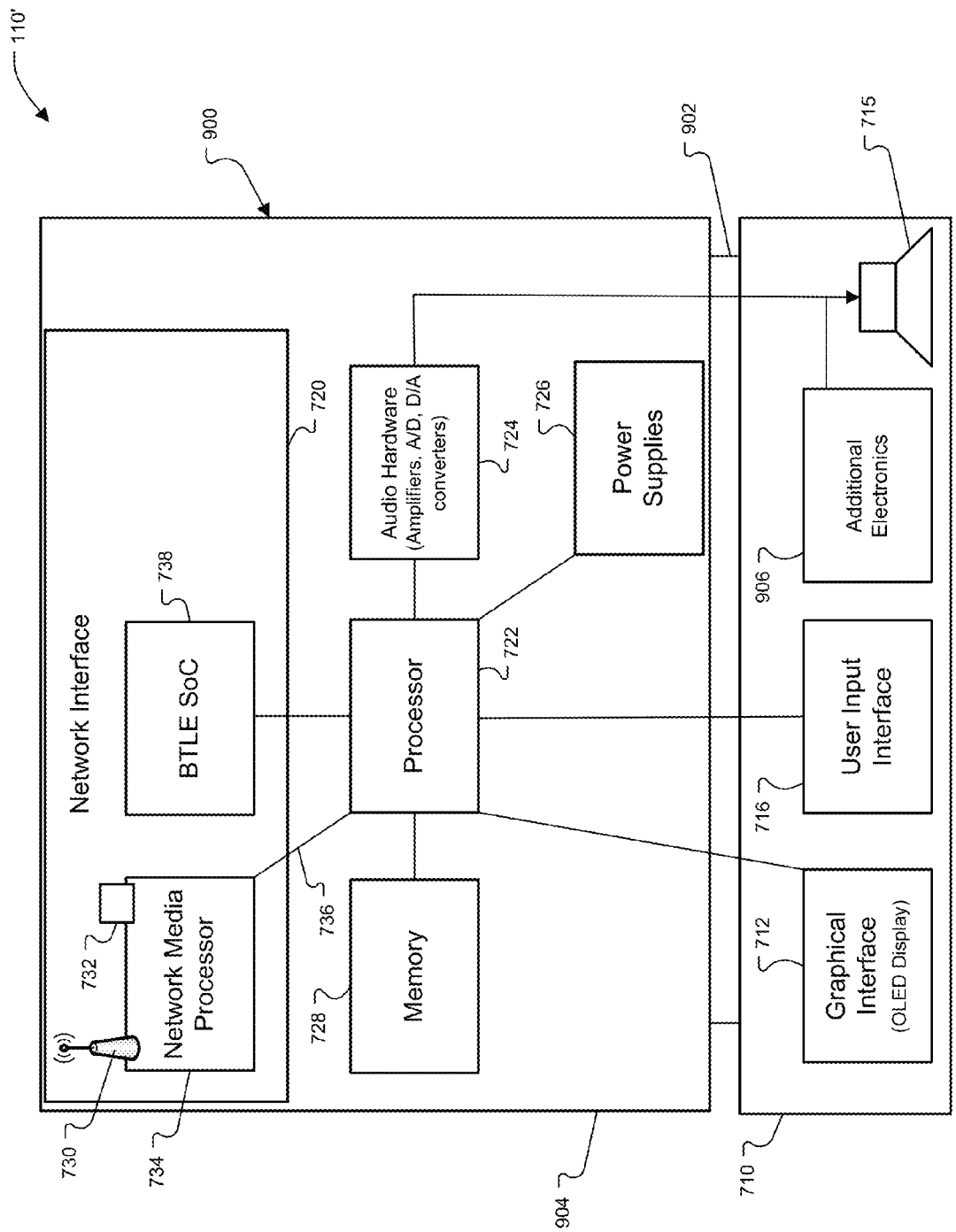
FIG. 9 is a block diagram of another implementation of an audio playback device that can be utilized in the audio system of FIG. 1.

FIG. 9 illustrates another implementation of an audio playback device 110' in which the audio playback device hardware is divided between the enclosure 710 and a separate device ("dongle 900"). The dongle 900 can be connected to the enclosure 710 via a wired connection 902. In the illustrated example of FIG. 9, the network interface 720, the processor 722, the audio hardware 724, and the power supplies 726 are located within a housing 904 of the dongle 900. The graphical interface 712 and the user input interface 716 are located on the enclosure 710. The enclosure 710 encloses the electro-acoustic transducer(s) 715 and may also include additional electronics 906 (e.g., processors, amplifiers, D/A converters, A/D converters, power supplies, etc.) for processing, converting and amplifying audio content from local audio sources (e.g., audio content stored in memory within the enclosure 710, a CD connected to the audio playback device, a portable music device such as an IPod connected to the audio playback device 110', etc.).

Controllers

Figure 10:
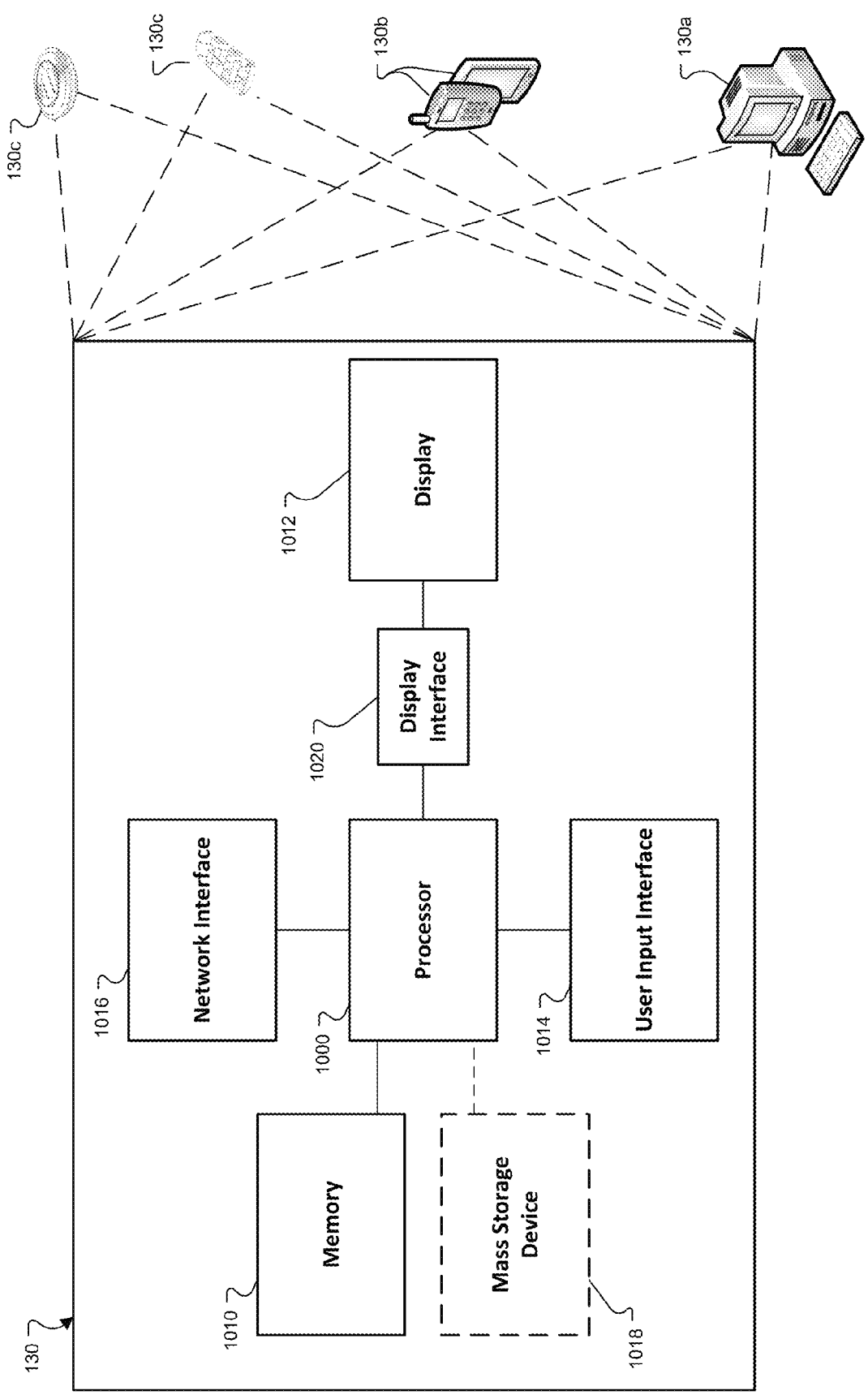
FIG. 10 is a block diagram of an exemplary controller from the audio system of FIG. 1.

Referring to FIG. 10, an exemplary controller 130 includes a processor 1000, a memory 1010, a display 1012, a user input interface 1014, and a network interface 1016, among other components. The controller 130 may also be provided with a mass storage device 1018, such as a hard drive, a micro-drive, or other device, to provide additional storage. Each of the processor 1000, the memory 1010, the display 1012, and the network interface 1016 are interconnected using various buses, and several of the components may be mounted on a common motherboard or in other manners as appropriate.

The processor 1000 can execute instructions (e.g., software) within the controller 130, including instructions stored in the memory 1010 or in a secondary storage device (e.g., mass storage device 1018). The processor 1000 may be implemented as a chipset of chips that include separate and multiple analog and digital processors. The processor 1000 may provide, for example, for coordination of other components of the controller 130, such as control of user interfaces, applications run by the controller 130, and network communication by the controller 130. The processor 1000 may communication with a user through the display 1012 and the user input interface 1014.

The processor 1000 may communicate with the user through a display interface 1020 coupled to the display 1012. The display 1012 may include an LCD monitor, or a touch sensitive display (e.g., in the case of a mobile device). The display interface 1020 may comprise appropriate circuitry for driving the display 1012 to preset graphical and other information to the user.

The user input interface 1014 may include one or more user input devices such as a keyboard, a pointer device such as a mouse, and/or a touch sensitive display. In some cases, the same device (e.g., a touch sensitive display) may be utilized to provide the functions of the display 1012 and the user input interface 1014.

The network interface 1016 facilitates wireless communication (e.g., Wi-Fi, Bluetooth, IR, etc.) with one or more of the audio playback devices (item 110, FIG. 1) via a corresponding network interface (item 720, FIG. 7C) on the audio playback device 110.

The memory 1010 stores information within the controller 130. In some implementations, the memory 1010 is a volatile memory unit or units. In some implementations, the memory 1010 is a non-volatile memory unit or units. The memory 1010 may also be another form of computer-readable medium, such as magnetic or optical disk.

The mass storage device 1018 is capable of providing mass storage for the controller 130. In some implementations, the mass storage device 1018 may be or contain a computer readable medium, such as a floppy disk device, a hard disk device, an optical disk device, or a tape device, a flash memory or other similar solid state memory device, or an array of devices.

Instructions (e.g., software) can be stored in an information carrier. The instructions, when executed by one or more processing devices (e.g., the processor 1000), perform one or more processes, such as those described above (e.g., with reference to FIGS. 2, 3, 5, 6 and 8). The instructions can also be stored by one or more storage devices such as computer- or machine-readable mediums (for example, the memory 1010, the storage device 1018, or memory in the processor 1000).

Figure 11:
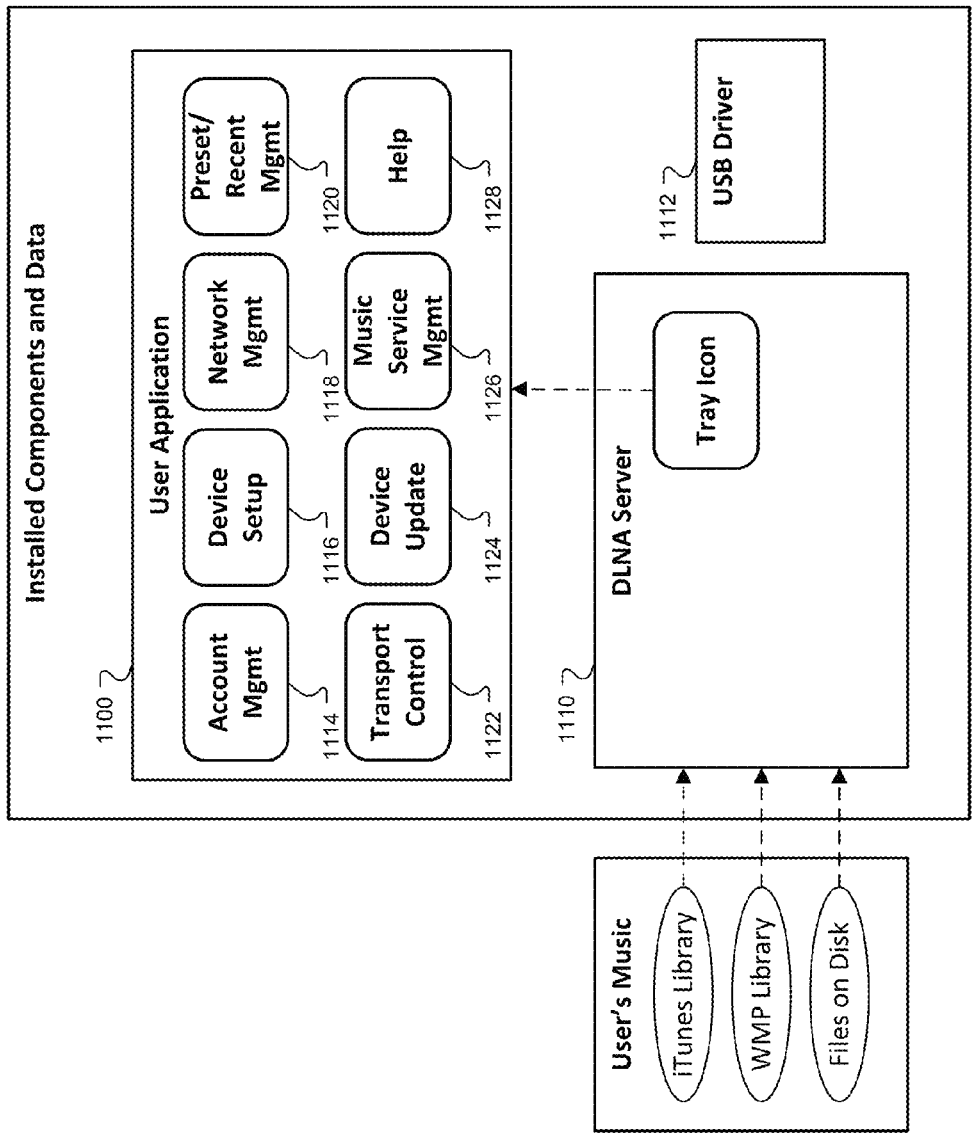
FIG. 11 is a block diagram of a software program for the controller of FIG. 10.

Referring to FIG. 11, the controller software can include a user application 1100, a DLNA server daemon 1110, and a USB driver 1112. The user application 1100 is run by the user and can be started from a daemon in response to a Region Icon command. The user application 1100 includes computer-executable instructions (e.g., software modules) for system account creation and management (i.e., creating and managing a user's system account) (1114); audio playback device registration and configuration (1116); network management (1118); preset/recent management (1120); transport control (e.g., play/pause, rewind/forward, etc.) for the audio playback devices (1122); initiating firmware updates for the audio playback devices (1124); music services setup (1126); and context sensitive help (1128). Each of these functions can be provided by a corresponding software module.

The DLNA server daemon 1110 serves music from the user's computer (e.g., iTunes, Windows Media Player, or files in a folder) to audio playback devices 110. The DLNA server 1110 is installed as a system service and always runs when the computer (controller 130) is booted. The DLNA server daemon 1110 shows as a tray icon when running in the background and can continue to serve music even when the user application 1100 is shut down. The DLNA server daemon 1110 can provide the user with the options for enabling and disabling the serving of the selected music library.

The USB driver 1112 defines how the audio playback device 110 communicates with the controller 130 over a local USB connection. The USB driver 1112 is installed as a device driver. In some cases, the USB driver 1112 is just an .INF file (i.e., a plain text information file) that points to a standard USB driver. The USB driver 1112 can be loaded by the controllers 130 operating system when the audio playback device 110 is connected via USB.

Figure 12:
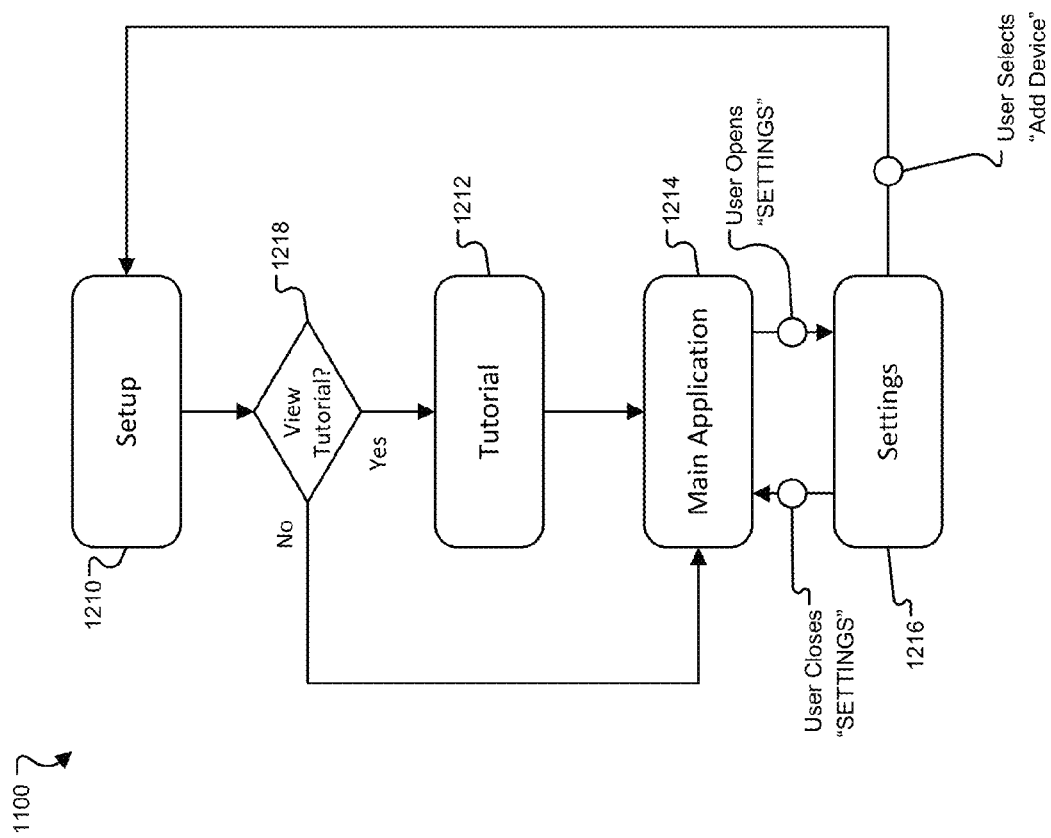
FIG. 12 is a state interaction diagram that shows an overview of four user interface states of a user application of the controller software program of FIG. 11.

FIG. 12 is a state interaction diagram that shows an overview of various user interface states of the user application 1100. Referring to FIG. 12, the user application consists of four primary user interface (UI) states: a setup state 1210; a tutorial state 1212; a main application state 1214; and a settings state 1216.

A first run of the user application 1100 initiates the setup state 1210. The setup state 1210 performs network (e.g., Wi-Fi/Ethernet) setup, system account creation, and music services setup via the corresponding software modules (FIG.

11). After a first run of the user application 1100, the Wi-Fi setup is automatically triggered when an audio playback device 110 (FIG. 1) is connected to a controller 130 (FIG. 1) via USB.

When the setup state 1210 is completed, the user is shown a pop-up 1218 that gives him/her the option to view a tutorial, or to skip it and go directly to the main application state 1214. If the user elects to view the tutorial, the tutorial state 1212 runs and provides a step-by-step overview of how to use the main application UI state. As mentioned above, the secondary network controllers 130*b* (FIG. 1) may not offer all of the functionality of the primary network controllers 103*a* (FIG. 1). More specifically, the secondary network controllers 130*b* may not provide the setup functions offered by the primary network controllers 130*a*, and, consequently, the secondary network controllers 130*b* may start at step 1218.

When the tutorial 1212 is complete, or if the user elects to skip the tutorial, the main application state 1214 runs. The main application state 1214 is the primary application view that the user interfaces with.

The user can access the settings state 1216 via the main application state 1214 (e.g., settings can be a menu item that is selectable from the main application state 1214. The settings state 1216 is an interface for adjusting system settings. The settings state 1216 can be used to: (i) adjust account settings (e.g., change an account password, delete an audio system account, etc.); (ii) adjust device settings (e.g., update software, change a device name, etc.); (iii) adjust presets and recents settings (e.g., change between local and global settings); (iv) adjust music services settings (e.g., add a music service, change location for local Internet radio, edit a Pandora® account, connect another Pandora® account); and adjust stored music settings (e.g., add or remove a music library).

Figure 13:
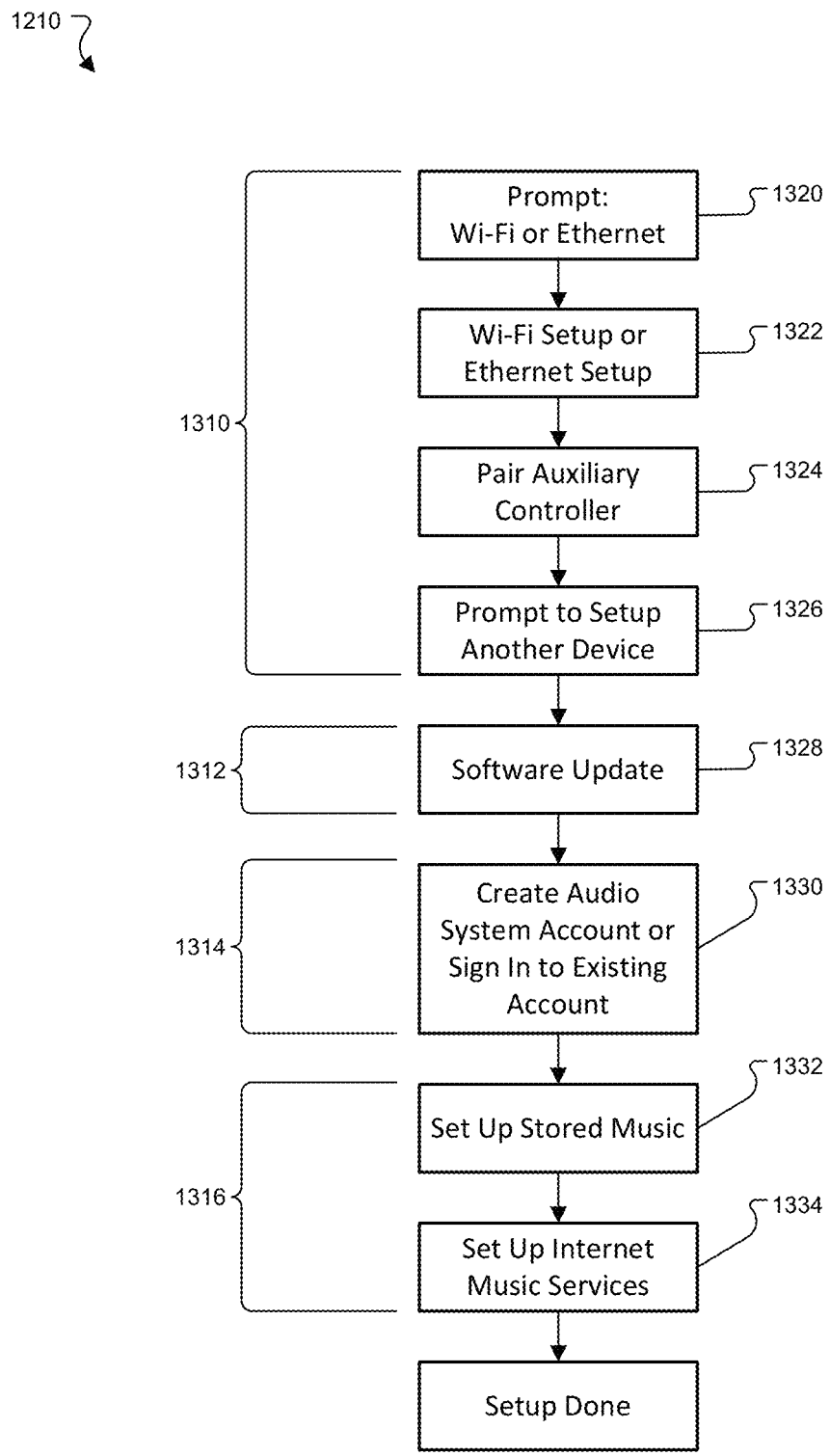
FIG. 13 illustrates a high-level workflow for a setup state from the state interaction diagram of FIG. 12.

FIG. 13 illustrates a high-level workflow for the setup state. The setup state 1210 consists of four main steps: Adding devices (e.g., audio playback devices and auxiliary controllers) to a user's system network (1310); audio playback device software update (1312); system account creation (1314); and music setup (1316).

The setup state 1210 is generally initiated when an audio playback device 110 is connected to the controller 130 via a USB connection. This starts the step of adding devices to an audio system network LAN 150 (FIG. 1), which will begin by prompting the user to select how the USB connected audio playback device 110 will connect to the LAN (item 150, FIG. 1) (e.g., via Wi-Fi connection or via Ethernet connection) (1320). Once the user selects the network connection type, the user will be prompted to setup the network connection (1322). This can include entering network credentials (e.g., entering a network name or selecting from a list of available networks and entering a password if the network is password protected).

Once a network connection is established, the user interface on the controller 130 can prompt the user to disconnect the audio playback device 110 from the controller 130 (i.e., disconnect the USB connection) and connect the audio playback device 110 to power where the user intends to use it, and then return to complete setup.

Next, the user interface can prompt the user to pair an auxiliary controller (BTLE controller) and can walk the user through the pairing process (1324). Then, the user can be prompted to setup additional devices (1326). Additional devices can be added by connecting via USB and going through the aforementioned steps for each subsequently added device.

In the next step (1328) of the setup process, device software is updated. The controller sends a command to the network connected audio playback devices to check for software updates (the software updates may be made available through the server and/or via a separate Internet service). The controller will prompt the user to update the audio playback devices if any updates are available and sends a command to the audio playback devices for update. The controller can indicate the software update progress via the user interface and can display a popup window in case of any errors.

Once updates are completed, the controller will guide the user through creating an audio system account or will prompt the user to sign in to an existing account (1330). The system account will be created on the server via direct interaction between the controller and the server.

Next, the controller guides the user through music setup (1316) which includes setting up the user's stored music sources including PC stored music, NAS devices, etc. (1332) as well as setting up Internet based audio sources (e.g., Pandora®, vTuner®, etc.) (1334).

In some cases, when setting up the digital audio sources, the user may be prompted to enter account credentials. For example, when adding a user's Pandora® account to the user's system account, the Pandora® Internet service may request account credentials from the user. In return, Pandora® will return a unique identifier ("token") that can be stored on the server and in memory on each of the audio playback devices and which will allow the audio playback devices subsequent access to the remote audio source without requiring login each time.

Figure 14A:
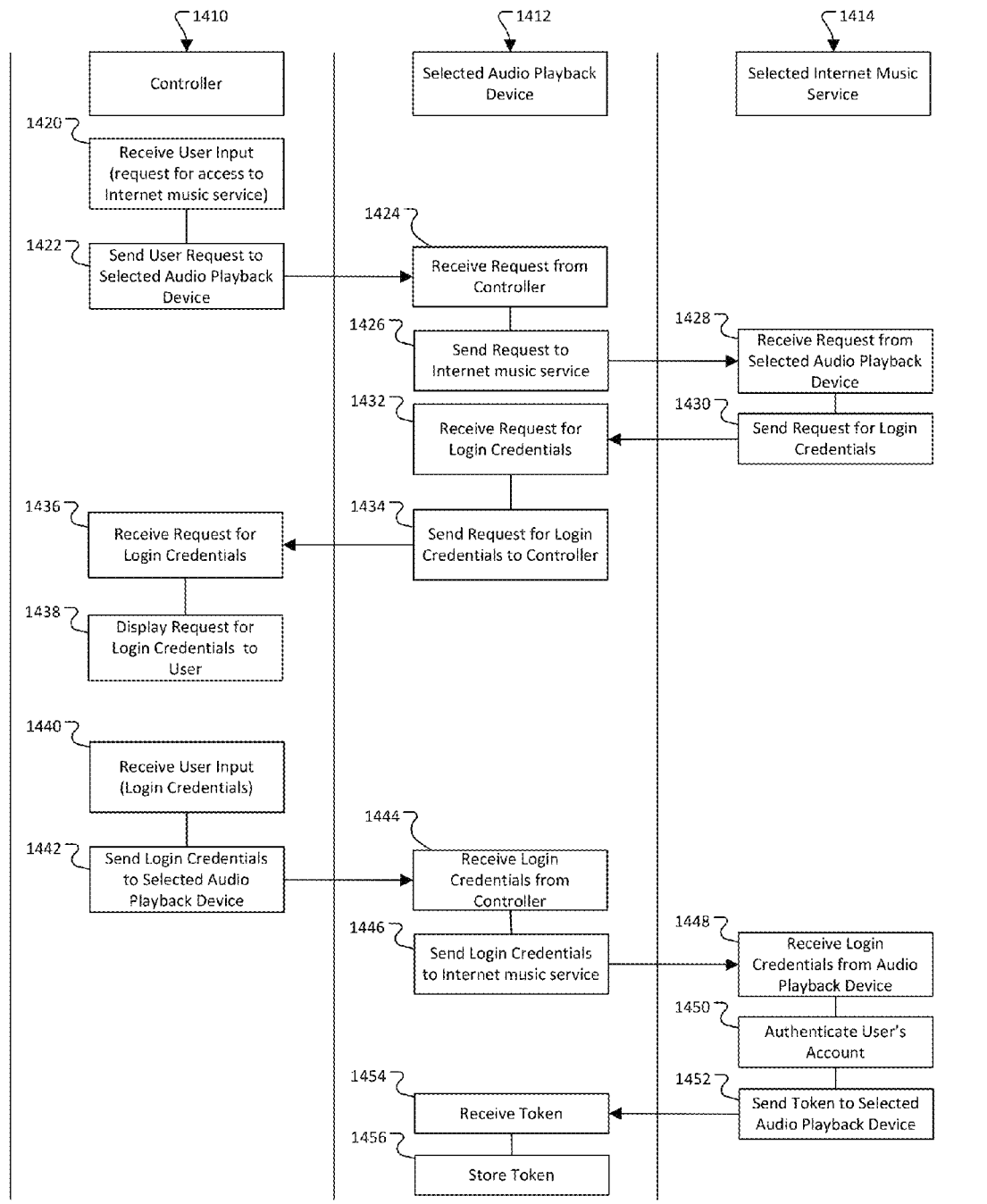
FIG. 14A is a swim lane diagram showing steps for music setup for an Internet music service within the audio system of FIG. 1.

FIG. 14A is a swim lane diagram showing steps for music setup for a digital audio source such as an Internet music service. Three swim lanes are shown in FIG. 14A including a lane for one of the controllers 1410, a lane for a selected one of the audio playback devices 1412, and a lane for a selected one of the digital audio sources (e.g., an Internet music service such as Pandora®) 1414.

At step 1420, the controller receives user input requesting access to an Internet music service, and, at step 1422, sends the request to a selected one of the audio playback devices.

The selected audio playback device receives the request from the controller (1424) and sends the request to the Internet music source (1426). Internet music source receives request (1428) and responds with a request for login credentials (1430).

The selected audio playback device receives the request for credentials (1432) and sends the request to the controller (1434). At step 1436, the controller receives the request for login credentials, and, at step 1438, the controller displays the request for login credentials to the user.

At step 1440, the controller receives login credentials from the user, and, at step 1442, the controller sends the login credentials to the selected audio playback device. The selected audio playback device receives the login credentials (1444) and sends the credentials to the Internet music service (1446).

At step 1448, the Internet music service receives the login credentials, and, at step 1450, authenticates the user's account. If the user's account is authenticated, the Internet music service will grant access and return a token to the selected audio playback device (1452). As discussed above, the token allows the Internet music service to identify and associate the device with a user's Internet music service account, thus obviating the need for login credentials after music services setup.

The selected audio playback device receives the token (1454), and stores the token within memory in the selected audio playback device (1456). The token can then be distributed to other devices within the audio system to allow those other devices to similarly access the Internet music service.

Figure 14B:
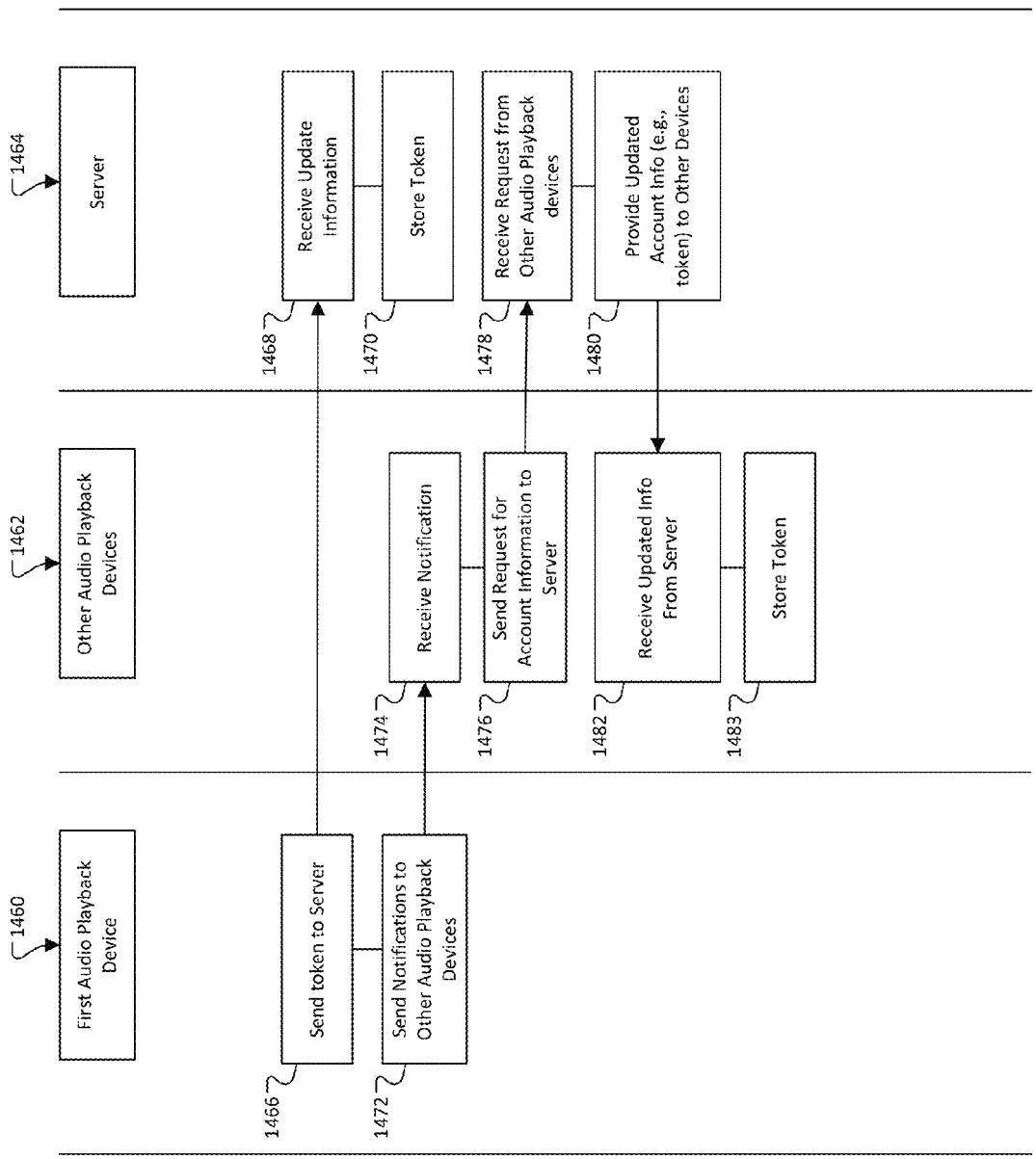
FIG. 14B is a swim lane diagram showing steps for distribution of tokens for accessing account based digital audio sources such as certain Internet music services within the audio system of FIG. 1.

FIG. 14B is a swim lane diagram showing steps for distribution of tokens for accessing account based digital audio sources such as certain Internet music services. Three swim lanes are shown in FIG. 14B including a lane for a first one of the audio playback devices 1460, a lane for the other audio playback devices in the audio system 1462, and a lane for the remote server 1464. The first one of the audio playback devices (the first audio playback device) corresponds to the selected one of the audio playback devices that was utilized by the selected one of the controllers to setup the Internet music service as described above with respect to FIG. 14A.

At step 1466, the first audio playback device sends a copy of the token received from the Internet music service to the server. The server receives the token from the first audio playback device (1468), and stores a copy of the token locally (e.g., within memory) on the server (1470).

At step 1472, the first audio playback device sends a communication to each of the other audio playback devices (e.g., a separate notification to each of the other audio playback devices) in the audio system notifying the other playback devices that there have been changes to the user's account (i.e., a new digital audio source has been added to the audio system).

At step 1474, the other audio playback devices receive the notification from the first audio playback device. In response to receiving the notification, each of the audio playback devices sends a communication to the server requesting information corresponding to the changes to the user's account (1476).

At step 1478, the server receives the requests from the other audio playback devices. In response to the requests received from the other audio playback devices, the server responds by providing the new account information (which may consist of a copy of the token for the recently added Internet music service) to each of the other audio playback devices (1480).

At step 1482, the other playback devices receive the new account information (e.g., a copy of the token) from the server. Upon receipt of the update information, the other playback devices update their locally stored copies of the user's account information (i.e., by adding the token to stored data) (1483).

The distribution of "tokens" can help to facilitate single press access to the sources (e.g., via the preset indicators on the audio playback devices) to provide for source agnostic operation (i.e., the audio playback devices behave the same regardless of the source). This can help to allow the preset indicators on the audio playback devices to provide access to their respectively assigned entities irrespective of the associated digital audio source.

Figure 15A:
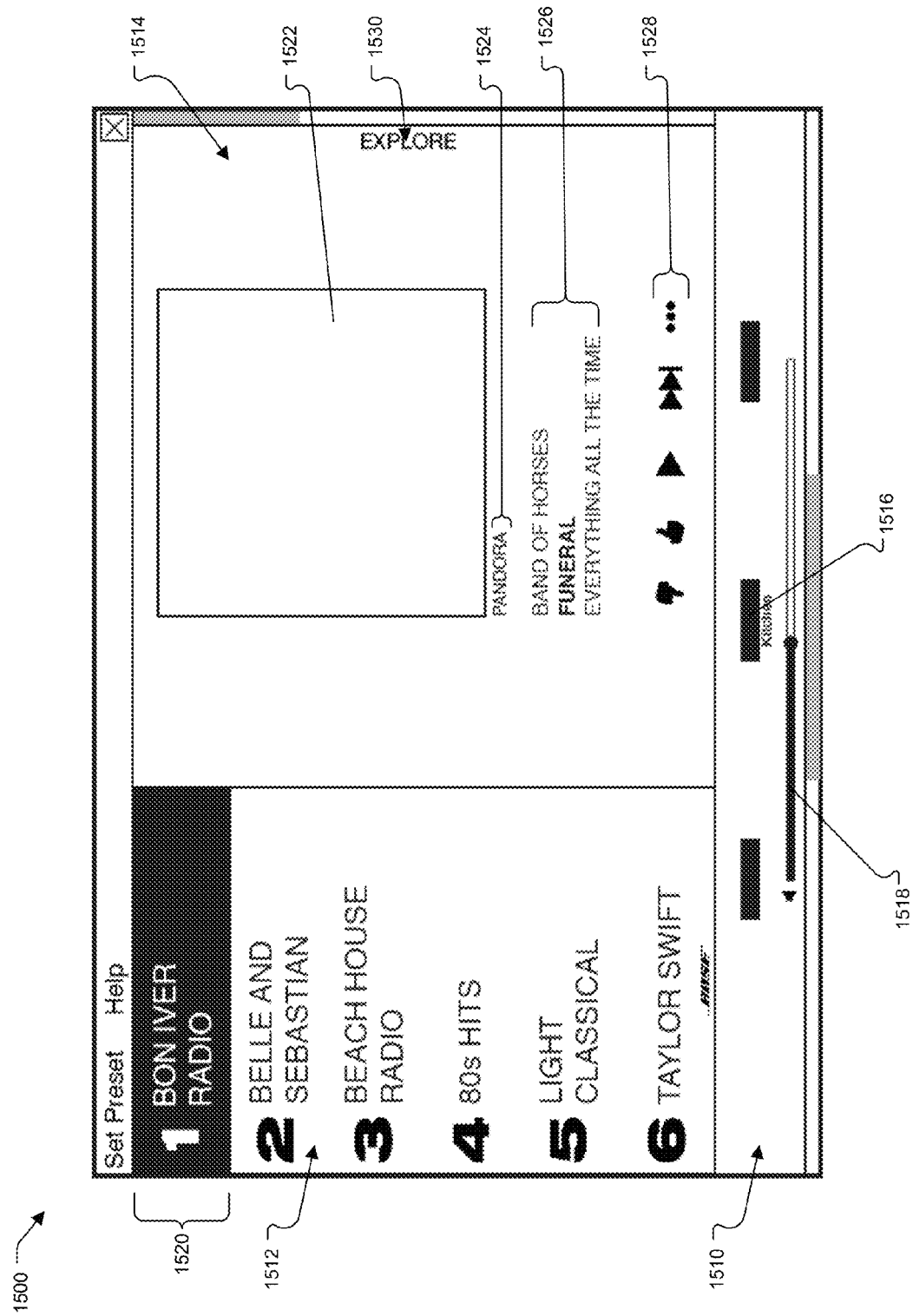
FIGS. 15A and 15B show a graphical user interface for a main application state, from the state interaction diagram of FIG. 12, in a "Now Playing" mode and an "Explore" mode, respectively, which may be suitable for a controller in the form of a desktop or laptop computer.

Referring to FIG. 15A, the user interface 1500 for the main application state includes: an audio playback device region 1510, a preset region 1512, and a source region 1514. The audio playback device region 1510 lists audio playback devices 1516 on the LAN (150, FIG. 1) that are available for control. User can select the audio playback device 1516 from the list of available devices. The device that is currently selected is centered in the region. This is the device for which now playing information, presets, and recents are shown. The audio playback device region 1510 includes a volume slider 1518 which can be used to control the volume of the selected device.

The preset region provides a list of preset indicators 1520 (in the form of virtual buttons) which correspond to the preset indicators (item 718, FIG. 7B) on the selected audio playback device. The list can include a description of the corresponding entity assigned to the preset indicator along with a numerical identifier for the preset indicator. Users can select a preset (e.g., by double-clicking) play content associated with the selected preset with the selected audio playback device. Or, as discussed below, the user can use the interface to assign entities to the presets.

Figure 15B:
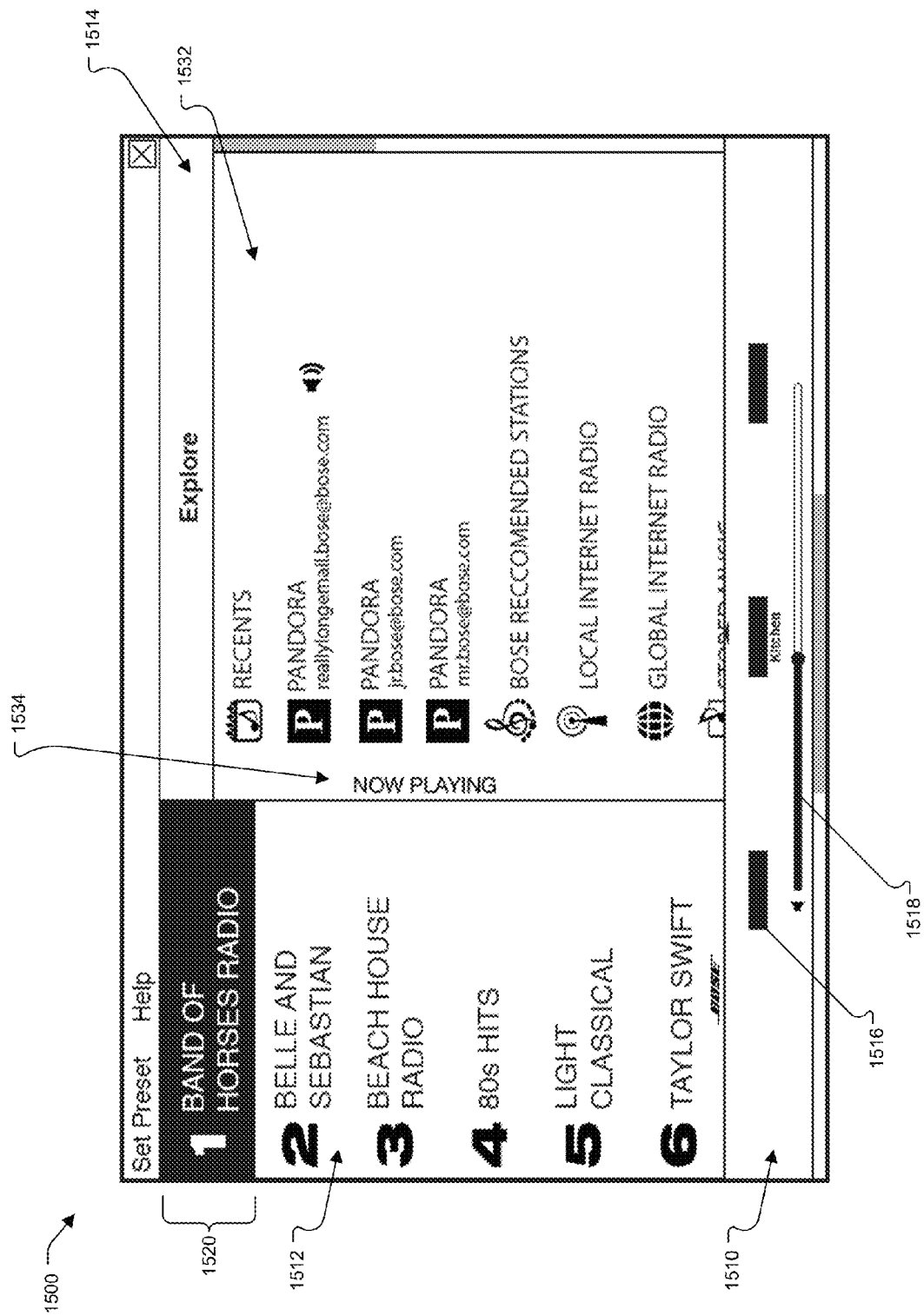

The source region 1514 displays one of two modes of the main application. The two modes of the main application include a "Now Playing" mode (FIG. 15A) and an "Explore" mode (FIG. 15B). In the Now Playing mode, the source region 1514 displays album art 1522 for content being played by the selected audio playback device. The source region 1514 includes an identification of the audio source 1524 for the playing content, as well as source specific now playing information 1526 such as Artist Name/Album Name/Track name. In Now Playing mode, the source region 1514 also includes source specific buttons 1528, which may include transport functions such as play, pause, skip forward, etc. Also displays an "Explore" button 1530 which allows the user to navigate to the Explore mode.

Referring to FIG. 15B, the Explore mode allows the user to browse available content and features. In the Explore mode, the source region 1514 displays one of a plurality of lists that the user can navigate through to select content to play, to select an entity to assign to a preset, to access Help content, and/or to manage settings.

A top-level Explore list (FIG. 15B) will include links 1532 to: digital audio sources (e.g., global and/or local Internet radio provided by vTuner®, stored music, Pandora®, etc.), recents list, help content, and the settings UI state. Audio sources with multiple accounts (e.g., multiple Pandora® accounts all associated with the user's system account) may be listed by date, with the first one set up listed first.

Figure 15C:
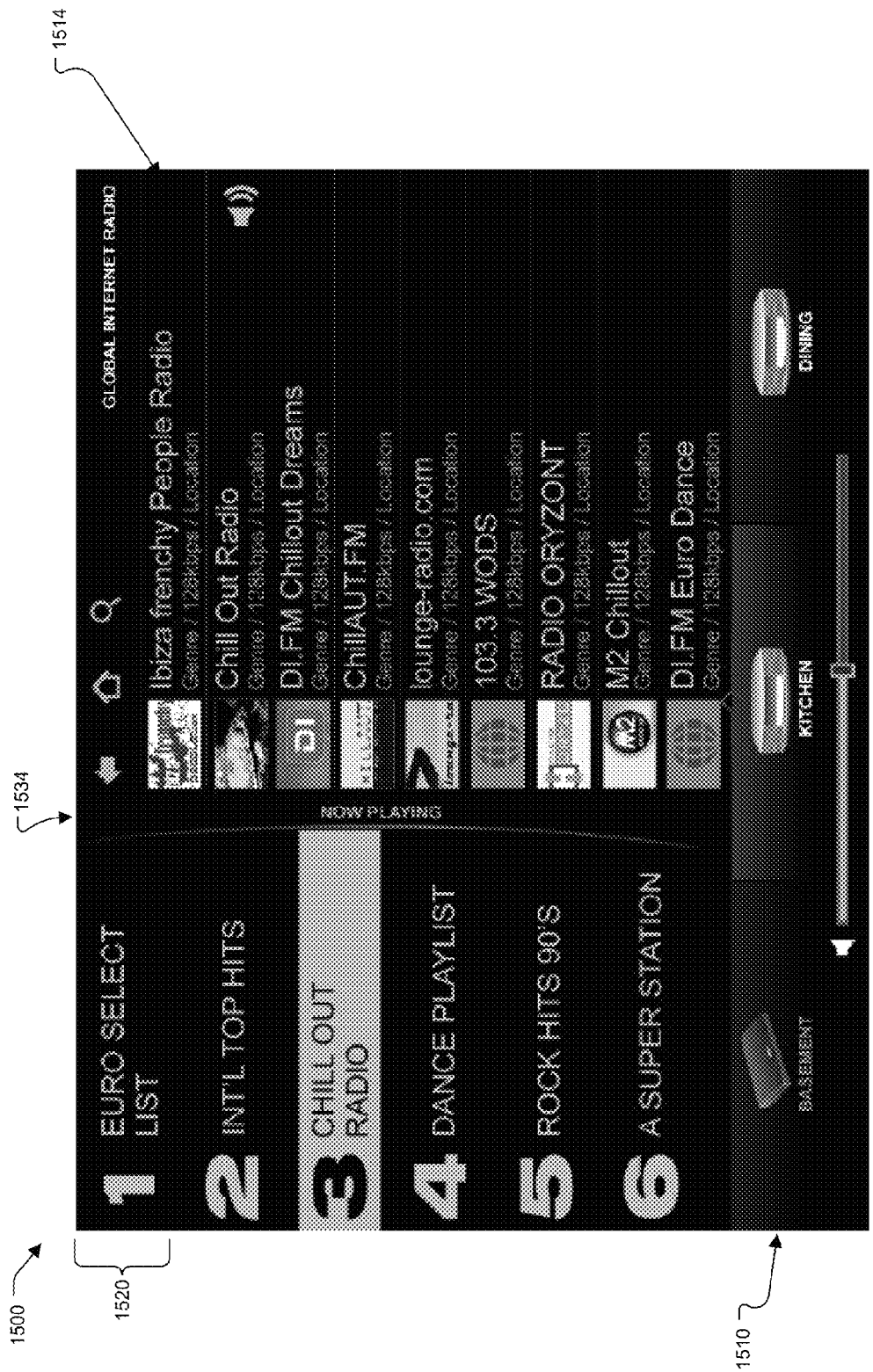
FIG. 15C is the user interface of FIG. 15B showing a sub-list of entities associated with an audio source named "Global Internet Radio".

Selection of an audio source opens a sub-list of entities (FIG. 15C, showing sub-list of entities) associated with the selected source (the "Global Internet Radio" source (e.g., provided by vTuner®)) in the source region 1514. The sub-list of entities is generated via communication between the controller, the selected audio playback device, and the selected audio source as discussed above. A "Now Playing" button 1534 allows the user to navigate to the Now Playing mode.

Figure 16A:
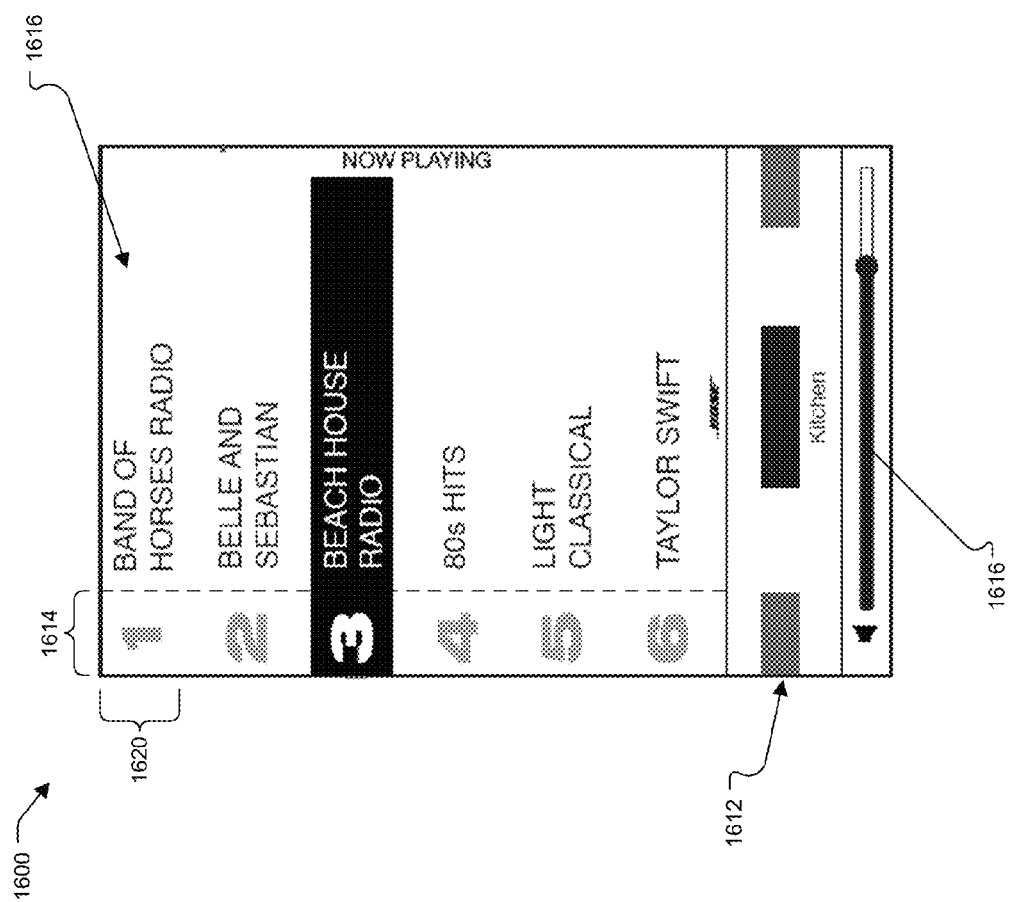
FIGS. 16A, 16B, and 16C show an alternative implementation of a user interface for the main application state in a "Preset" mode, a "Now Playing" mode, and an "Explore" mode, respectively, which may be suitable for a controller in the form of mobile device such as a smart phone.
Figure 16B:
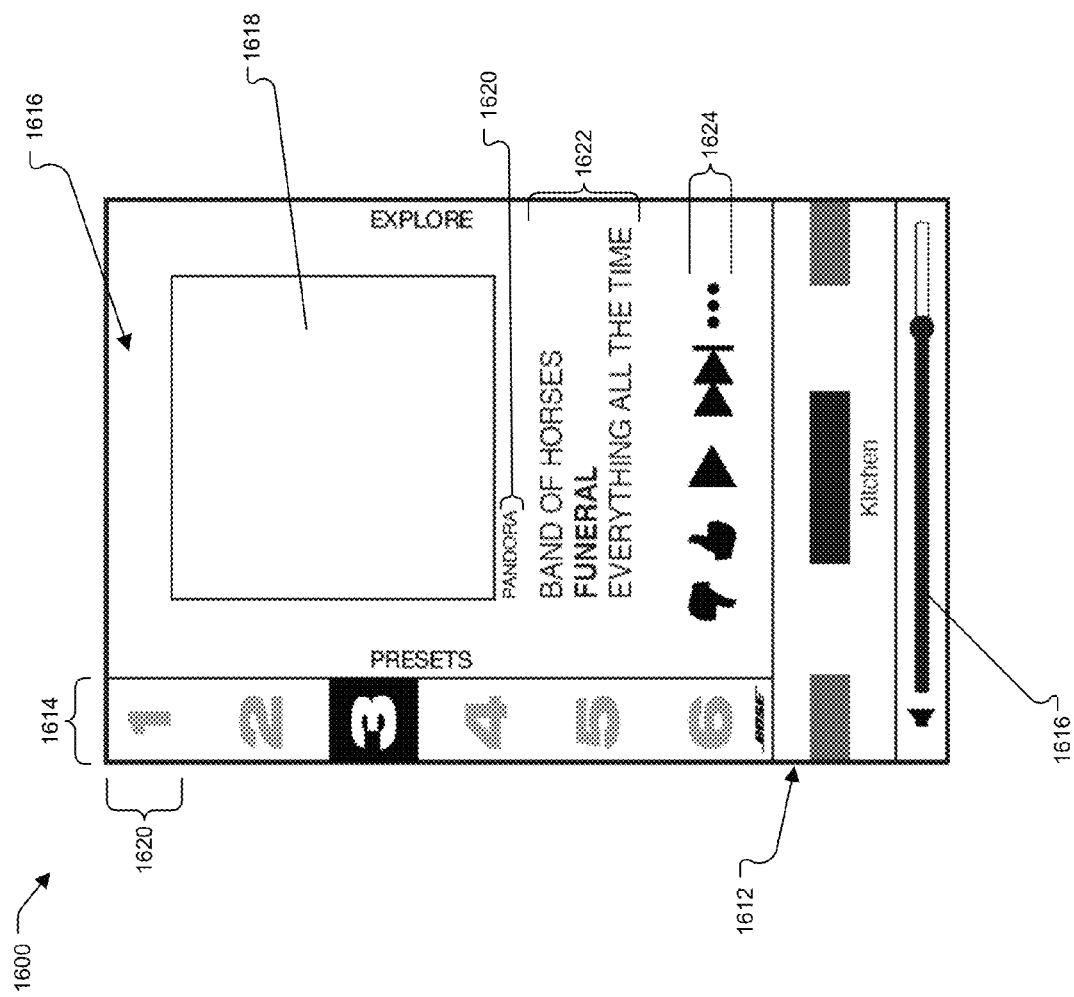
Figure 16C:
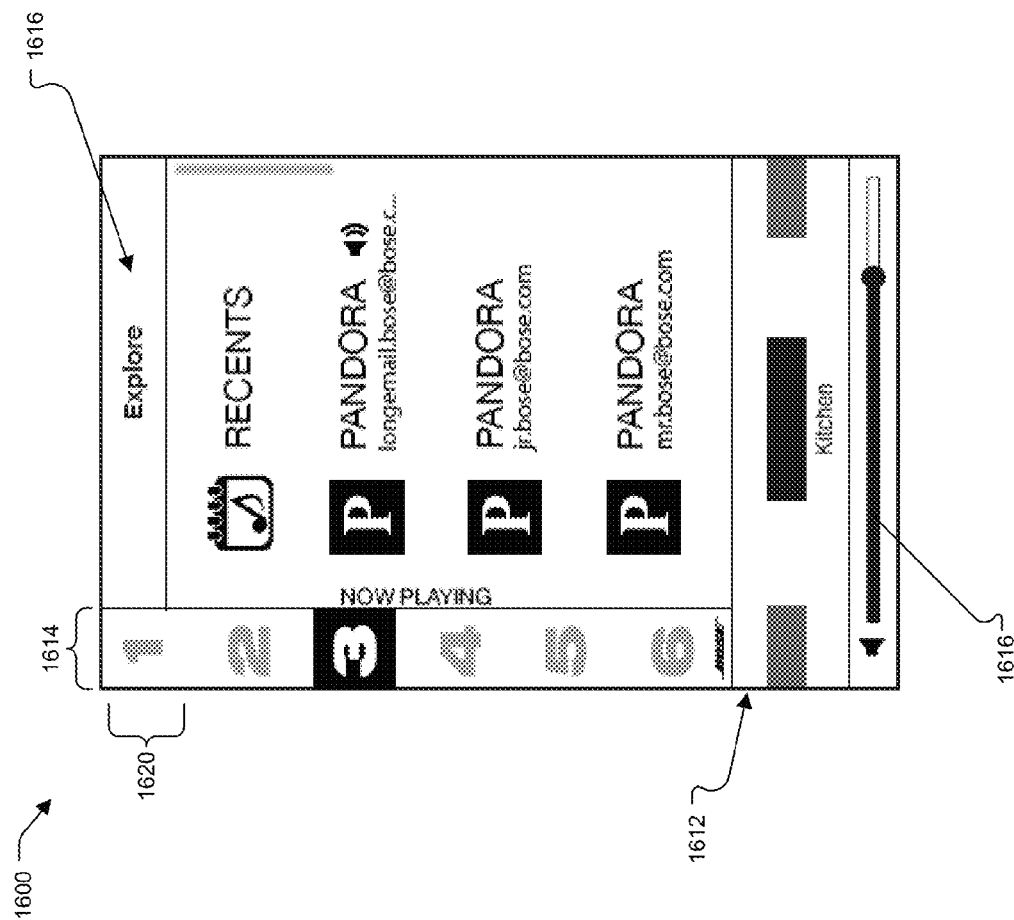

FIGS. 16A through 16C illustrate another implementation of a graphical user interface 1600 for the main application that may be utilized for mobile devices. In the implementation of FIGS. 16A-16C, the main application can be in one of three modes: Presets mode (FIG. 16A), Now Playing mode (FIG. 16B), or Explore mode (FIG. 16C). The user can navigate between Presets, Now Playing, and Explore modes by swiping/navigating left/right amongst these modes.

Referring to FIG. 16A, the user interface 1600 for the main application includes: an audio playback device region 1612, a presets region 1614, and a source region 1616. The audio playback device region 1612 lists audio playback devices on the LAN (item 150, FIG. 1) that are available for control. User can select the audio playback device from the list of available devices. The Audio playback device region 1612 includes a volume slider 1616 which can be used to control the volume of the selected device.

The presets region 1614 includes a list of preset indicators 1620 (in the form of virtual buttons) which correspond to the preset indicators on the selected audio playback device. The preset indicators (item 718, FIG. 7B) are identified by corresponding numerical identifiers for each preset indicator. Users can select a preset (e.g., by double-clicking) play content associated with the selected preset with the selected audio playback device.

The source region 1616 displays the Presets mode, the Now Playing mode, or the Explore mode of the main application. In the Preset mode, shown FIG. 16A, the source region 1616 displays additional information for the device presets. The additional information can include a description of the corresponding entity assigned to the preset along with a numerical identifier for the preset button.

In the Now Playing mode (FIG. 16B), the source region 1616 displays album art 1618 for content being played by the selected audio playback device. The source region 1616 also includes an identification of the audio source 1620 for the playing content, as well as source specific now playing information 1622 such as Artist Name/Album Name/Track name. In the Now Playing mode, the source region 1616 also includes source specific buttons 1624, which may include transport functions such as play, pause, skip forward, etc.

The Explore mode (FIG. 16C) allows the user to browse available content and features. In the Explore mode, the source window displays one of a plurality of menus that the user can navigate through to select content to play, to select an entity to assign to a preset, to access Help content, and/or to manage settings.

A top-level Explore list will include links to: available audio sources, recents, help content, and the settings UI state. Audio sources with multiple accounts (e.g., multiple Pandora® accounts all associated with the user's system account) may be listed by date, with the first one set up listed first.

Selection of an audio source opens a sub-list of entities associated with the selected source in the source window. The sub-list of entities is generated via communication between the controller, the selected audio playback device, and the selected audio source as discussed above.

Figure 17:
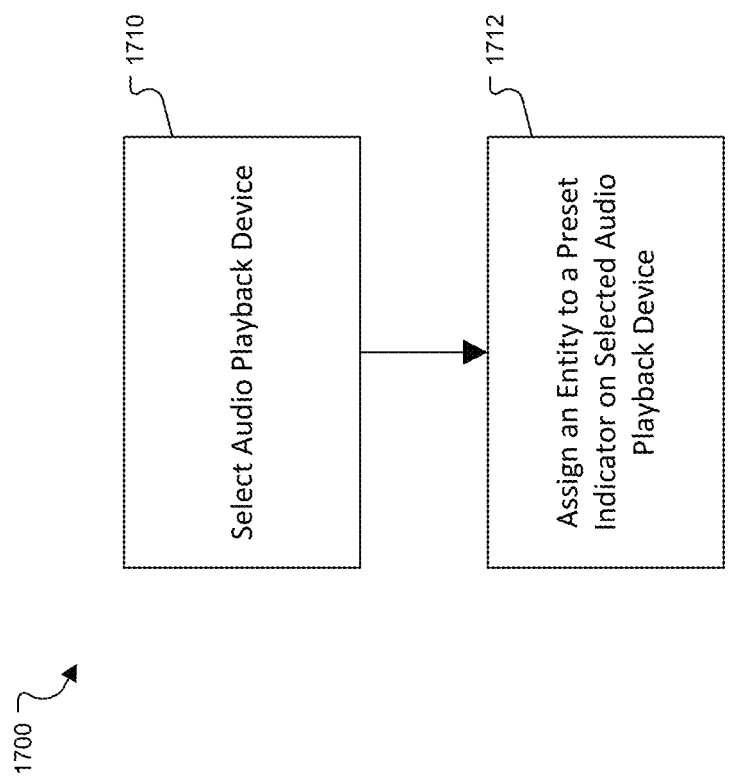
FIG. 17 illustrates a process flow for setting preset from a controller within the audio system of FIG. 1.

FIG. 17 illustrates a process 1700 for setting preset from a controller. The process 1700 includes selecting an audio playback device from the audio playback device region of the user interface (1710). The selected audio playback device will be the device that the controller utilizes to communicate with the digital audio sources. The process 1700 also includes assigning an entity to a preset indicator on the selected audio playback device (1712).

In this regard, preset assignments can be set from either the "Now Playing" mode or the "Explore" mode of the main application. Assigning from the Now Playing mode will assign entity associated with currently playing content to the selected preset.

Figure 18A:
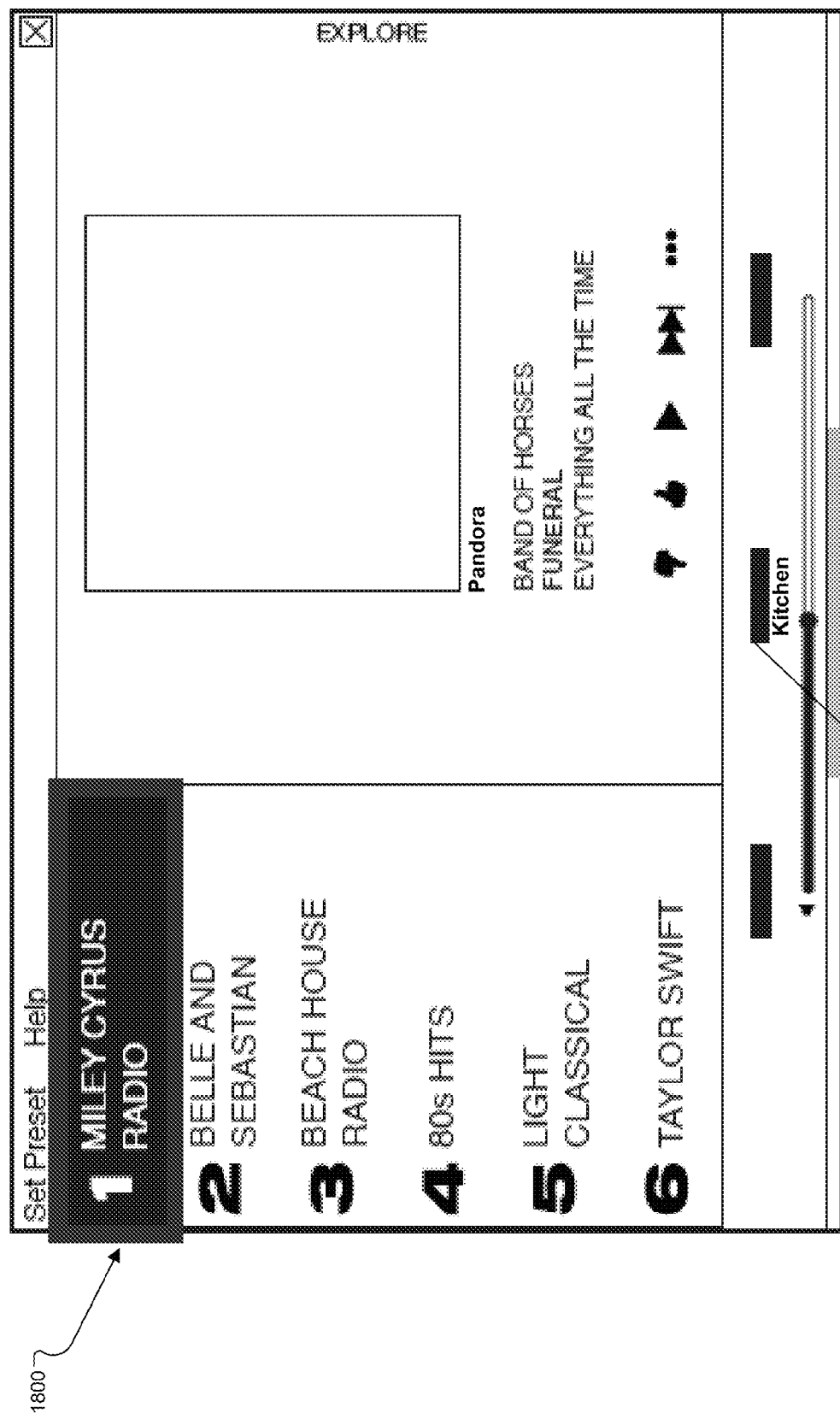
FIGS. 18A and 18B show a sequence of screen displays illustrating the setting of a preset assignment, by selecting and holding a preset indicator, in the "Now Playing" mode on a desktop or laptop computer.
Figure 18B:
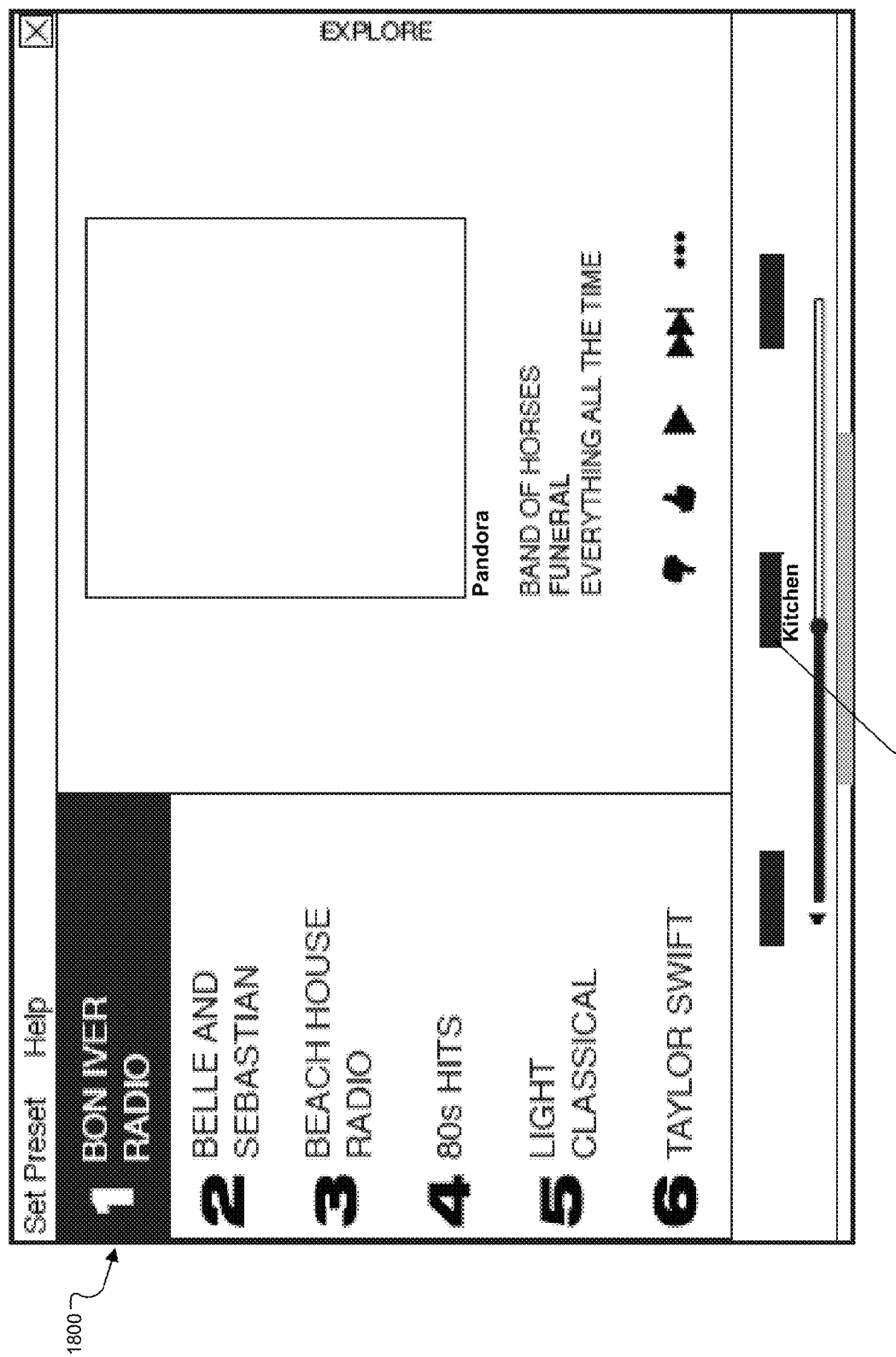

FIGS. 18A and 18B show a sequence of screen displays illustrating the setting of a preset assignment from the Now Playing mode on a desktop or laptop computer. Referring to FIGS. 18A and 18B, the user selects (e.g., by clicking with pointing device (mouse) or tapping in the case of a touch sensitive screen) and holds one of the preset indicators 1800 to cause the preset indicator to be highlighted (FIG. 18A). After the selected preset indicator 1800 is held for a predetermined amount of time, the preset indicator 1800 will be assigned to the "Now Playing" entity. This may be indicated by a change in the text associated with the preset indicator 1800 (e.g., the text may be updated to reflect the newly associated entity's name, as shown in FIG. 18B). The new or updated preset assignment will take effect on the selected audio playback device 1810 (i.e., the device selected in the audio playback region) which is being controlled by the controller.

Figure 19A:
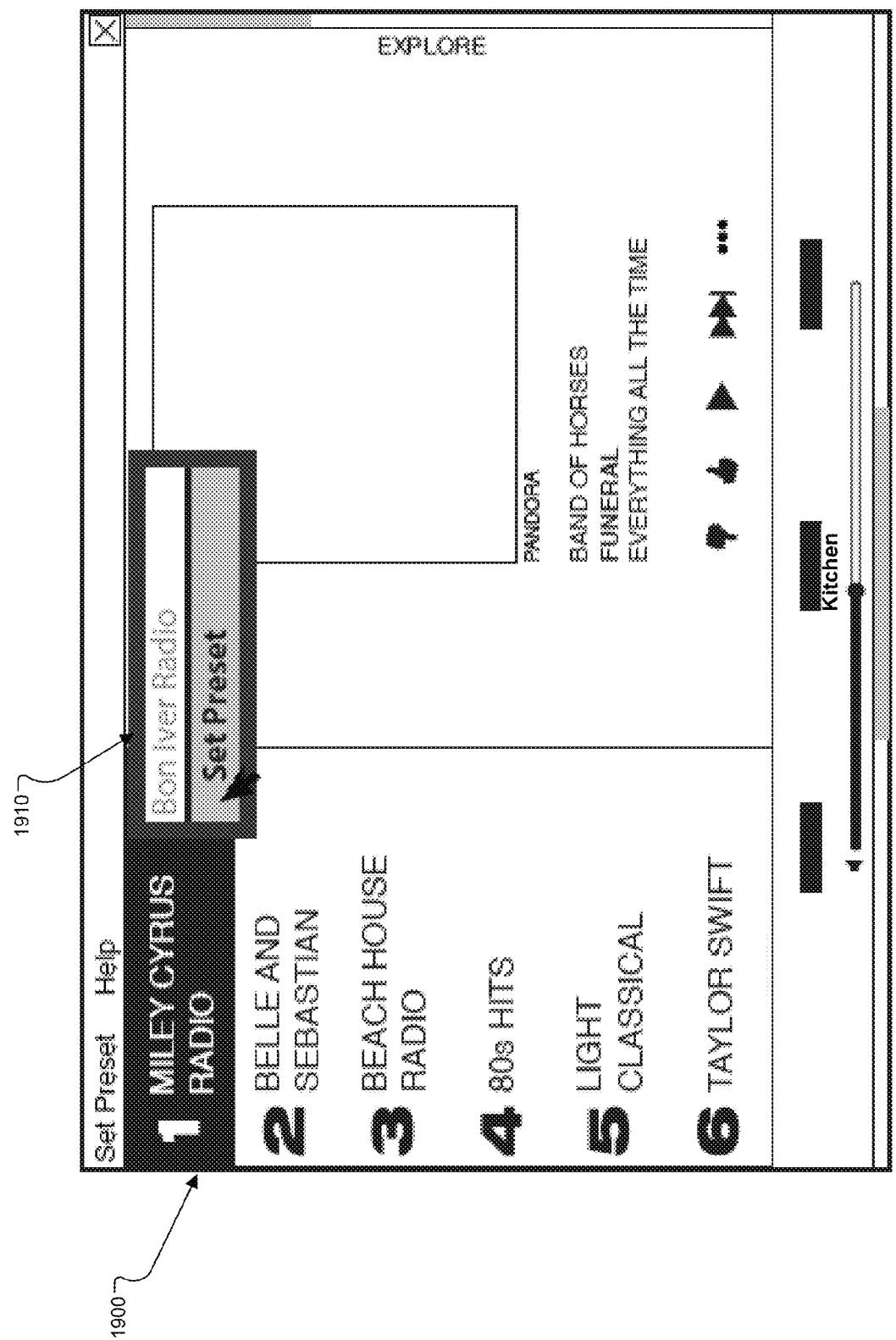
FIGS. 19A and 19B show a sequence of screen displays illustrating the setting of a preset assignment, by right-clicking on one the preset indicators and selecting "Set Preset" from a right-click menu, in the "Now Playing" mode on a desktop or laptop computer.
Figure 19B:
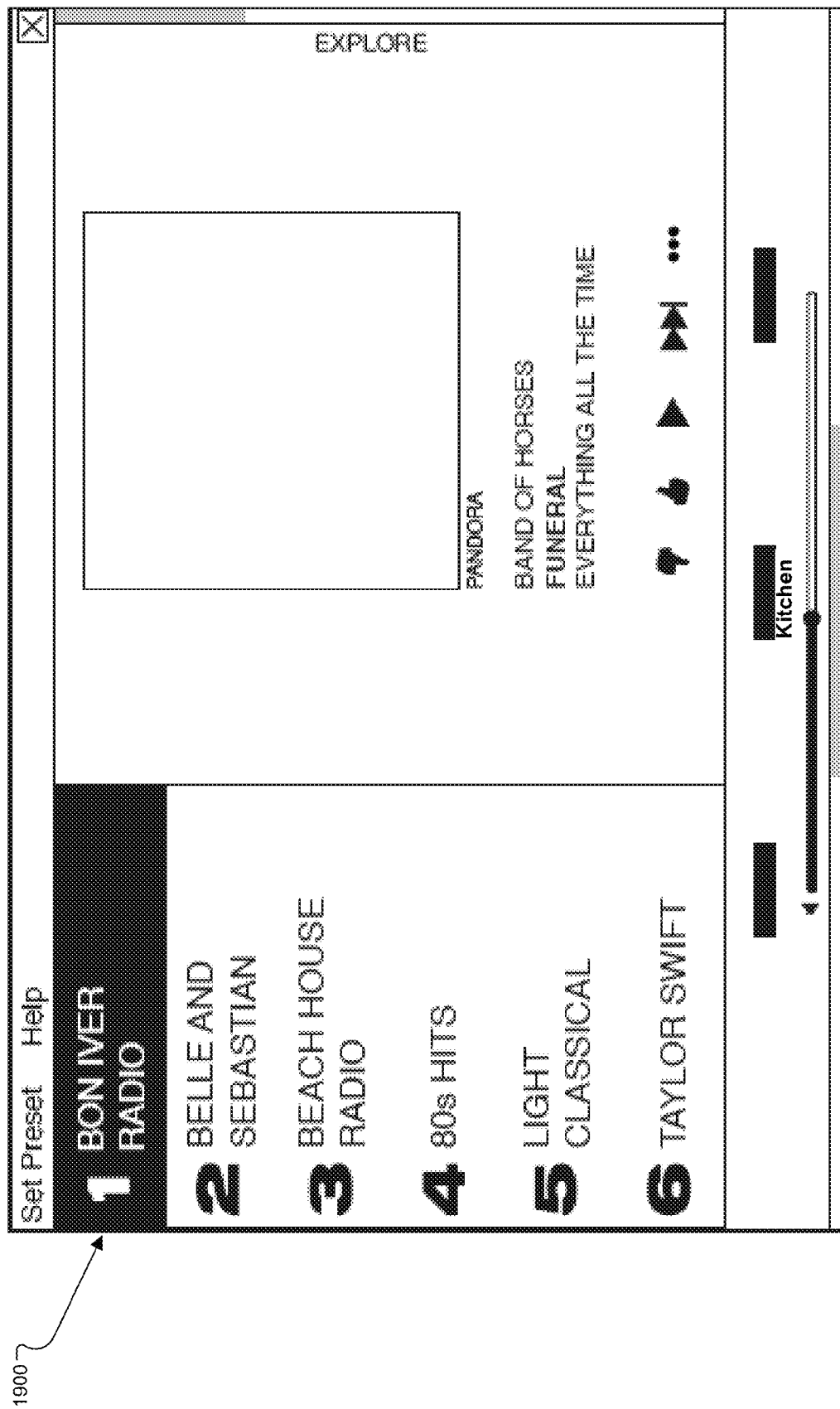

Alternatively, as illustrated in FIGS. 19A and 19B, the user can right-click on one the preset indicators 1900 and select "Set Preset" from a right-click menu 1910 to assign the entity associated with the currently playing content to be assigned to the selected preset indicator 1900.

Figure 20A:
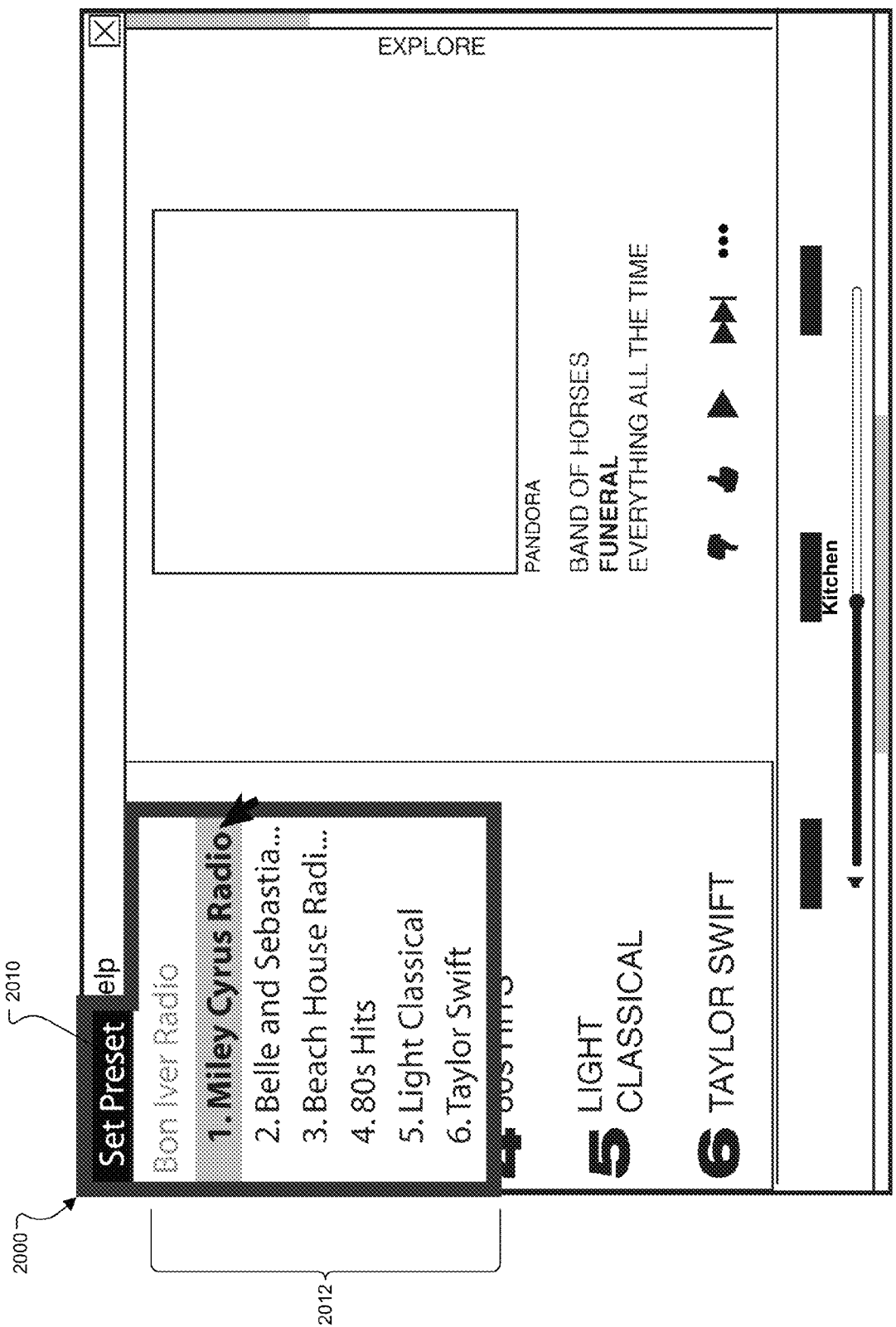
FIGS. 20A and 20B show a sequence of screen displays illustrating the setting of a preset assignment, by selecting a preset indicator from a preset menu, in the "Now Playing" mode on a desktop or laptop computer.
Figure 20B:
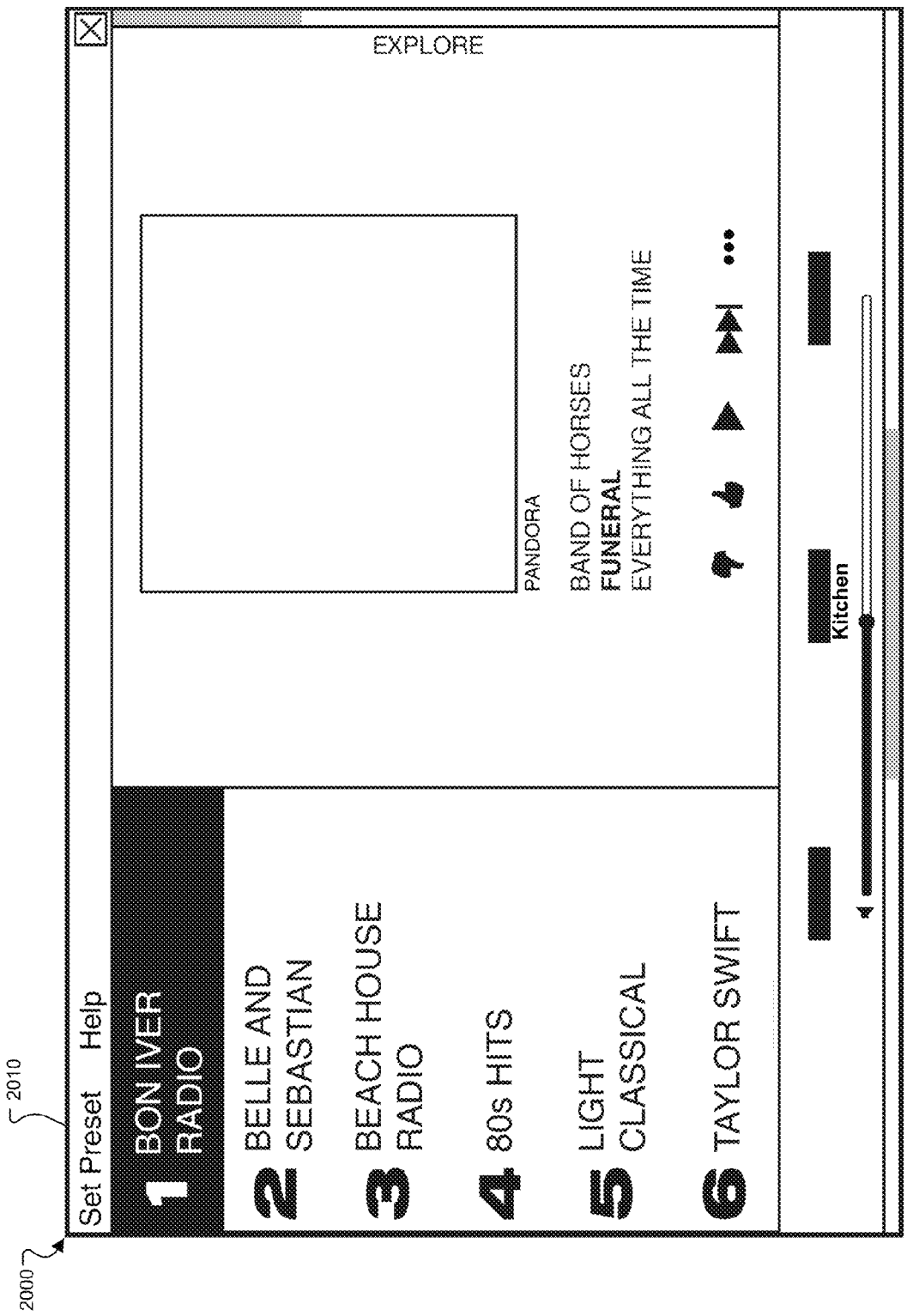

Alternatively, Referring to FIGS. 20A and 20B, the main application state may include a menu bar 2000 with a "Set Preset" button 2010. The user can set a preset assignment by clicking on the "Set Preset" button 2010 to display a Preset menu 2012. The user can choose a preset from the preset menu 2012 to assign the entity (e.g., Internet radio station) associated with the "Now Playing" content to. Preset changes may be indicated by text changes to the station name associated with the preset indicator (FIG. 18B).

Figure 21A:
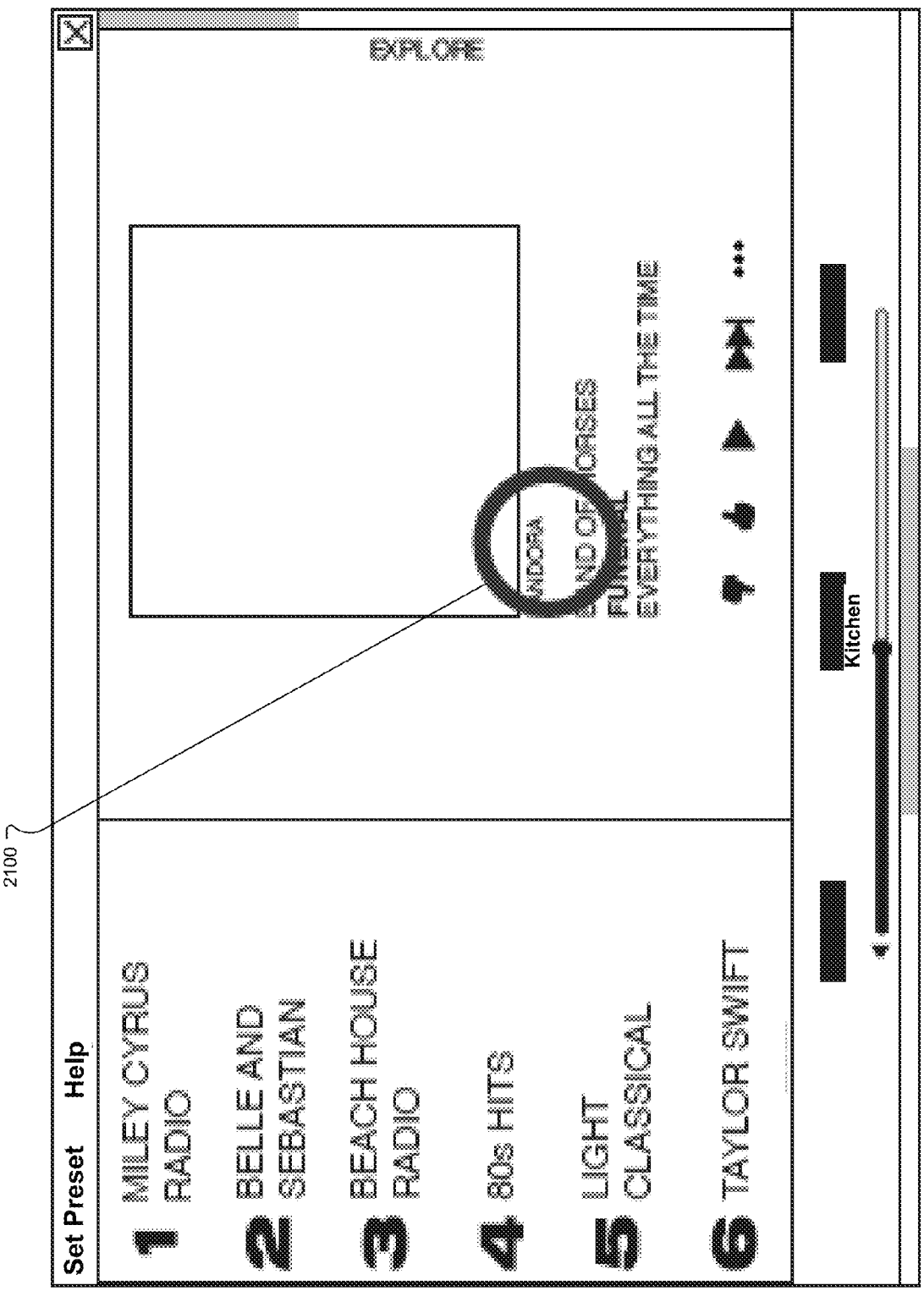
FIGS. 21A through 21C show a sequence of screen displays illustrating the setting of a preset assignment, by drag and drop, in the "Now Playing" mode on a desktop or laptop computer.
Figure 21B:
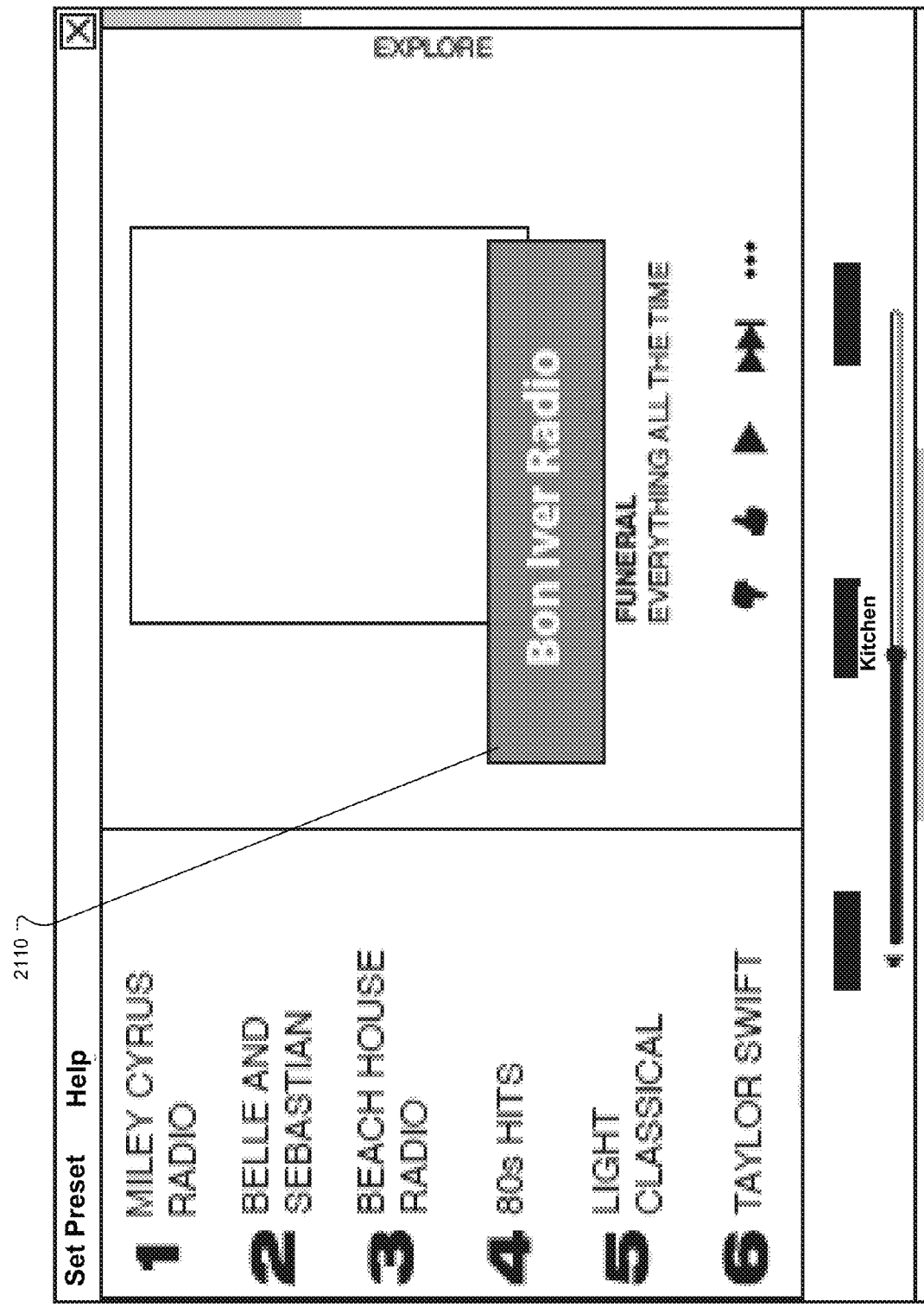
Figure 21C:
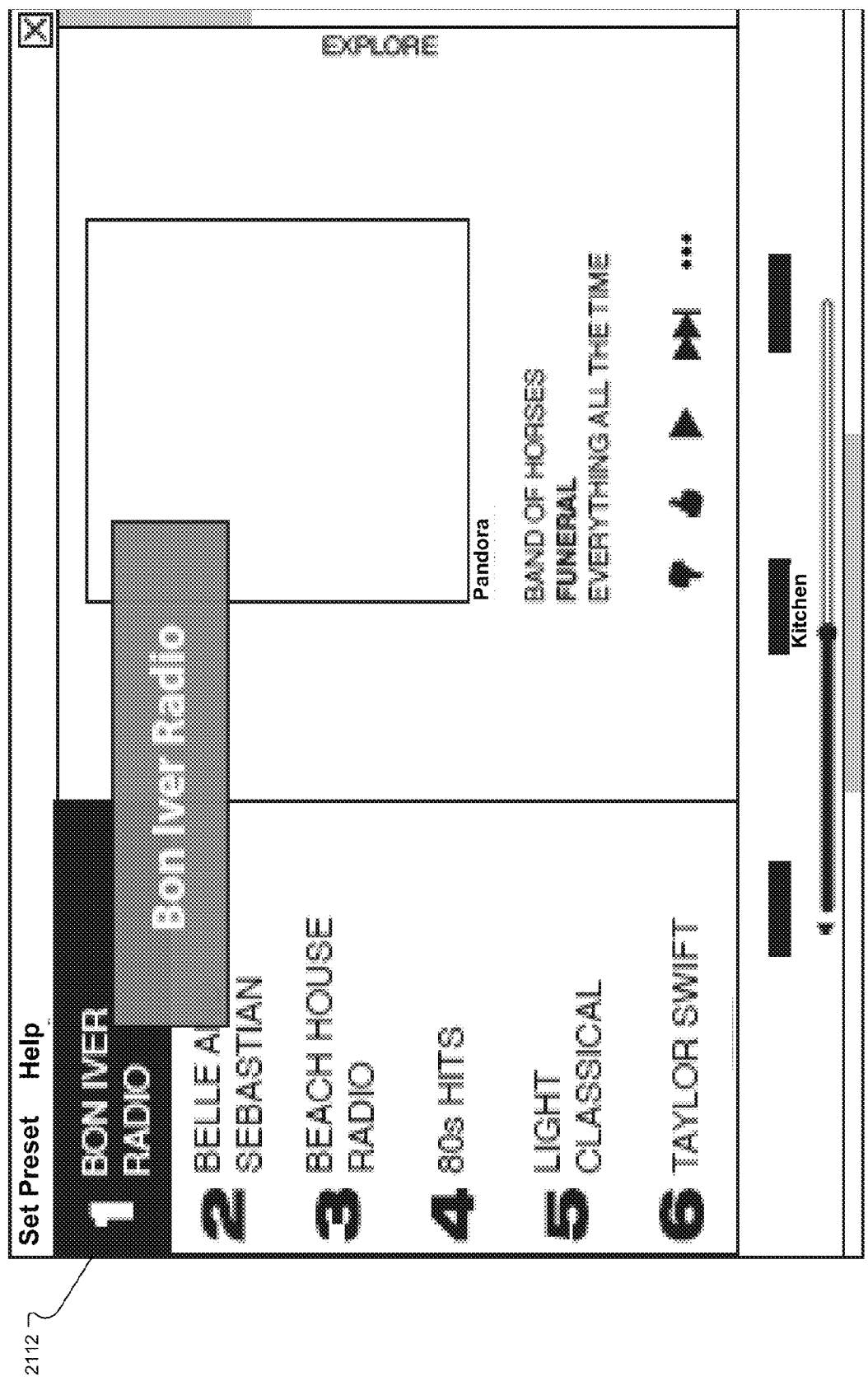

FIGS. 21A through 21C illustrate yet another method of setting a preset from the "Now Playing" mode. The user can click/tap 2100 and hold within the source region (FIG. 19A). The entity to be assigned to a preset appears in a pop-up 2110 in the clicked/tapped area (FIG. 19B). And the entity is dragged and dropped on the destination preset indicator 2112 (FIG. 19C).

Figure 22A:
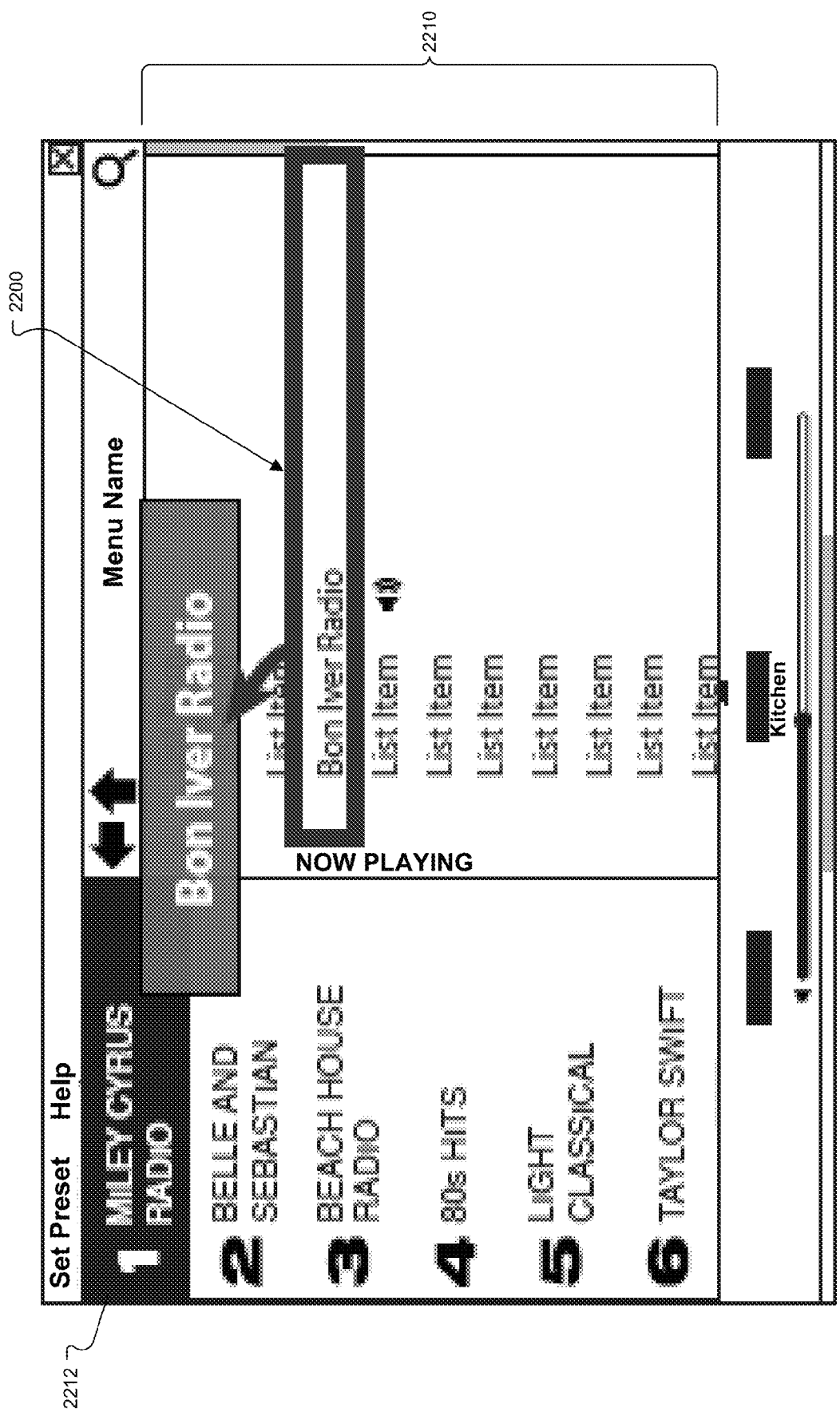
FIGS. 22A and 22B show a sequence of screen displays illustrating the setting of a preset assignment, by drag and drop, in the "Explore" mode on a desktop or laptop computer.
Figure 22B:
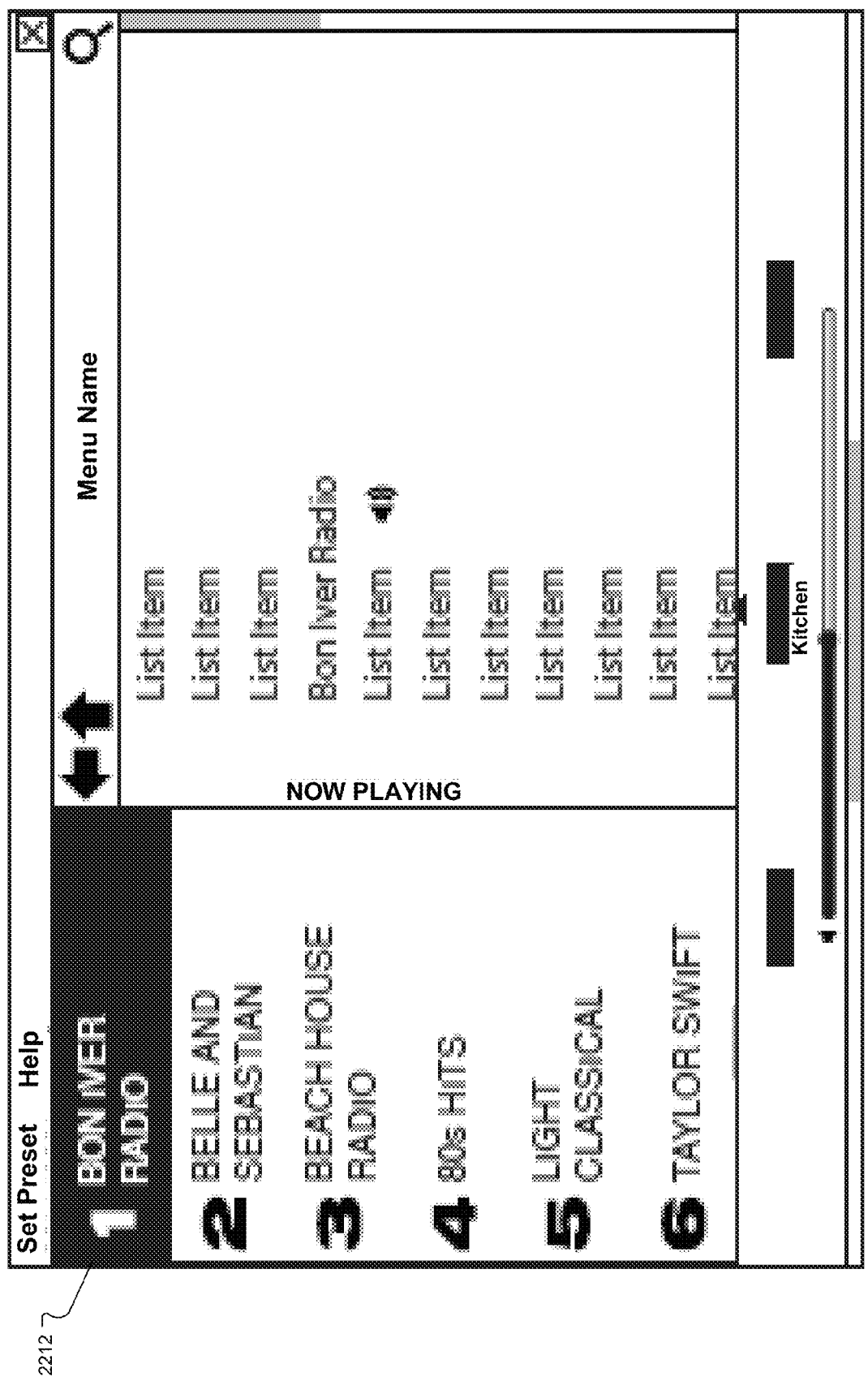

FIGS. 22A and 22B illustrate a method of assigning a preset in the Browse mode. The user selects an entity 2200 from a list of entities 2210 and drags the selected entity to the preset indicator 2212 (FIG. 20A). The preset assignment is updated to reflect the change. This can be reflected by a text update on the preset indicator 2212 (FIG. 20B).

Alternatively, the preset assignment can be set or changed on the audio playback device itself by pressing and holding one of the preset indicators on the device's enclosure. This will assign an entity associated with currently plating content to the selected preset indicator.

Once a preset assignment is set for the first time or changed on one of the audio playback devices, the preset assignments can be synchronized across the audio system as described above with respect to FIG. 2.

Server

Figure 23:
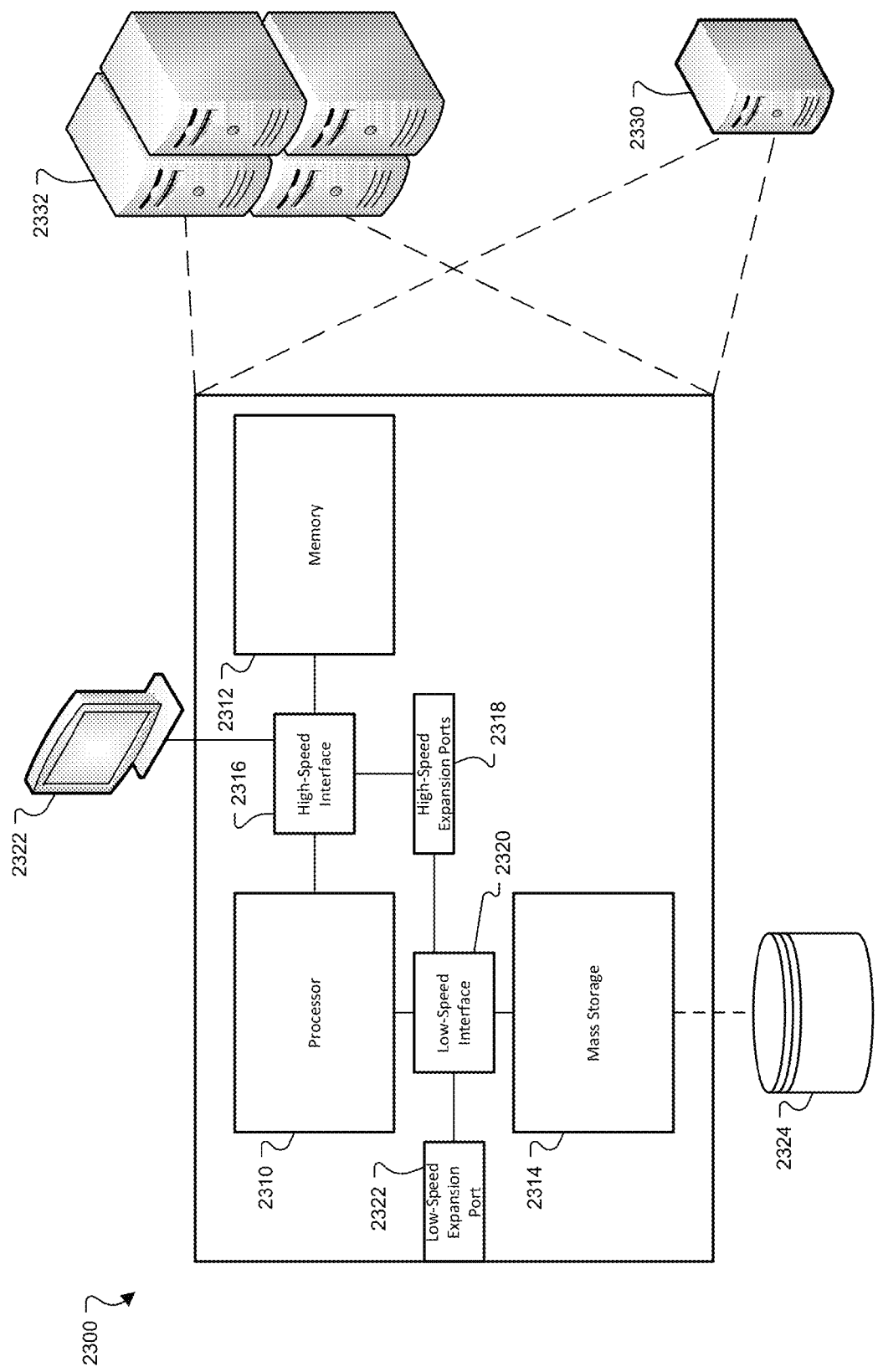
FIG. 23 is a block diagram of a computing device that can be used to implement the server of the audio system of FIG. 1.

FIG. 23 illustrates an exemplary computing device 2300 that can be utilized to implement the server (item 140, FIG. 1). The computing device 2300 is intended to represent various forms of digital computers, such as servers, blade servers, mainframes, and other appropriate computers. The components shown here, their connections and relationships, and their functions, are meant to be examples only, and are not meant to be limiting.

The computing device 2300 includes a processor 2310, a memory 2312, a storage device 2314, a high-speed interface 2316 connecting to the memory 2312 and multiple high-speed expansion ports 2318, and a low-speed interface 2320 connecting to a low-speed expansion port 2322 and the storage device 2314. Each of the processor 2310, the memory 2312, the storage device 2314, the high-speed interface 2316, the high-speed expansion ports 2318, and the low-speed interface 2320 are interconnected using various busses, and may be mounted on a common motherboard or in other manners as appropriate. The processor 2310 can process instructions (e.g., a software program) for execution within the computing device 2300, including instructions stored in the memory 2312 or on the storage device 2314 to display graphical information for a GUI on an external input/output device, such as a display 2324 coupled to the high-speed interface 2316. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 2312 stores information within the computing device 2300. In some implementations, the memory 2312 is a volatile memory unit or units. In some implementations, the memory 2312 is a non-volatile memory unit or units. The memory 2312 may also be another form of computer-readable medium, such as a magnetic or optical disk.

The storage device 2314 is capable of providing mass storage for the computing device 2300. In some implementations, the storage device 2314 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 2310), perform one or more processes, such as those described above (e.g., with reference to FIGS. 2, 3, 5, 6, 14B). The instructions can also be stored by one or more storage devices such as computer-readable mediums (for example, the memory 2312, the storage device 2314, or memory on the processor 2310). The storage device 2314 may provide storage for a database 2324. The database can be used to store audio system account information.

The high-speed interface 2316 manages bandwidth-intensive operations for the computing device 2300, while the low-speed interface 2320 manages lower bandwidth-intensive operations. Such allocation of functions is an example only. In some implementations, the high-speed interface 2316 is coupled to the memory 2312, the display 2322 (e.g., through a graphics processor or accelerator), and to the high-speed expansion ports 2318, which may accept various expansion cards (not shown). In the implementation, the low-speed interface 2320 is coupled to the storage device 2314 and the low-speed expansion port 2322. The low-speed expansion port 2322, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 2300 may be implemented in a number of different forms, as shown in the figure. For example, it may be implemented as a standard server 2330, or multiple times in a group of such servers 2332. It may also be implemented as part of a rack server system.

Implementations of the systems and methods described above comprise computer components and computer-implemented steps that will be apparent to those skilled in the art. For example, it should be understood by one of skill in the art that the computer-implemented steps may be stored as computer-executable instructions on a computer-readable medium such as, for example, floppy disks, hard disks, optical disks, Flash ROMS, nonvolatile ROM, and RAM. Furthermore, it should be understood by one of skill in the art that the computer-executable instructions may be executed on a variety of processors such as, for example, microprocessors, digital signal processors, gate arrays, etc. In addition, the instructions may be implemented in a high-level procedural and/or object-oriented programming language, and/or in assembly/machine language. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

A number of implementations have been described. Nevertheless, it will be understood that additional modifications may be made without departing from the scope of the inventive concepts described herein, and, accordingly, other implementations are within the scope of the following claims.

What is claimed is:

1. An audio system comprising:
   A) an audio playback device configured to operably connect to a plurality of digital audio sources, the audio playback device comprising:
      ii) a digital-to-analog converter configured to receive a digital representation of content from the digital audio sources and convert to analog form;
      ii) an electro-acoustic transducer;
      iii) a set of user-selectable preset indicators, wherein each indicator in the set of preset indicators is configured to have assigned to it an entity associated with the plurality of digital audio sources;
      iv) a processor; and
      v) instructions stored on a computer-readable media that, when executed, cause the processor to:
      receive notification from an other audio playback device within an audio system regarding changes to preset assignments on the other audio playback device;
      and, in response to receiving the notification regarding changes to the preset assignments on the other audio playback device, to contact a remote server for the audio system to request update information; and to
      update one or more preset assignments on the audio playback device based on the update information received from the remote server such that preset assignments on the audio playback device correspond to respective preset assignments on the other audio playback device, each of the preset assignments representing an assignment of an entity associated with one of the digital music sources to a corresponding one of the preset indicators; and
   B) a first control device wirelessly coupled to the audio playback device via a first wireless communication interface and comprising a first level of control functionality; and
   C) a second control device wirelessly coupled to the audio playback device via a second wireless communication interface and comprising a second level of control functionality that is greater than the first level of control functionality.

2. The audio system of claim 1, wherein the digital audio sources include a plurality of Internet radio sites, and the entities include individual radio stations provided by the Internet radio sites.

3. The audio system of claim 1, wherein the digital audio sources comprise at least (i) one or more libraries of user-defined playlists of digital music files and (ii) Internet radio sites.

4. The audio system of claim 1, wherein a least one of the first control device and the second control device is configured to communicate with the remote server.

5. The audio system of claim 1, wherein at least one of the first and second control devices is configured to communicate with the remote server.

6. The audio system of claim 1, further comprising a third control device wirelessly coupled to the playback device and responsible for controlling the audio playback device via a third wireless communication interface and comprising a third level of control functionality that is greater than the second level of control functionality.

7. The audio system of claim 6, wherein the first wireless communication interface comprises infrared, the second wireless communication interface comprises Bluetooth and the third wireless communication interface comprises Wi-Fi.

8. The audio system of claim 6, wherein the third control device comprises a network controller.

9. The audio system of claim 8, wherein the audio playback device further comprises an enclosure, the enclosure further comprising:

a digital-to-analog converter configured to receive a digital representation of content from the digital audio sources and convert to analog form;
an electro-acoustic transducer; and
a set of user-selectable preset indicators, wherein each indicator in the set of preset indicators is configured to have assigned to it an entity associated with the plurality of digital audio sources.

10. The audio system of claim 9, wherein the set of user-selectable preset indicators provide access to the respectively assigned entities in the same manner irrespective of the associated digital audio source.

11. The audio system of claim 9, wherein the set of user-selectable preset indicators provide for single press access to the respectively assigned entities irrespective of the digital audio source.

12. The audio system of claim 9 wherein at least one of the first level of control functionality, the second level of control functionality, and the third level of control functionality comprises a wireless control set of user-selectable preset indicators corresponding to the set of user-selectable preset indicators.

* * * * *